(12) United States Patent
Simpson

(10) Patent No.: US 8,875,511 B2
(45) Date of Patent: Nov. 4, 2014

(54) GEOTHERMAL WIND SYSTEM

(75) Inventor: Larry Clark Simpson, Cincinnati, OH (US)

(73) Assignee: Larry C. Simpson, Cincinnati, OH (US)

( * ) Notice: Subject to any disclaimer, the term of this patent is extended or adjusted under 35 U.S.C. 154(b) by 230 days.

(21) Appl. No.: 13/436,390

(22) Filed: Mar. 30, 2012

(65) Prior Publication Data

US 2013/0257055 A1 Oct. 3, 2013

(51) Int. Cl.
- *F03G 7/00* (2006.01)
- *F01B 21/04* (2006.01)
- *F24J 3/08* (2006.01)
- *F03D 3/00* (2006.01)
- *F03D 9/00* (2006.01)

(52) U.S. Cl.
CPC .. *F24J 3/08* (2013.01); *Y02E 10/14* (2013.01); *Y02E 10/725* (2013.01); *F03D 3/00* (2013.01); *F03D 9/002* (2013.01); *F03G 7/00* (2013.01)
USPC ................. 60/641.2; 60/698; 290/44; 290/55

(58) Field of Classification Search
CPC ............ F24J 3/08; Y02E 10/10; Y02E 10/14; Y02E 10/18; Y02E 10/70; Y02E 10/72; Y02E 10/725; F03G 7/00; F03D 1/00; F03D 3/00; F03D 9/00; F03D 9/002; F03D 9/006

USPC ........................... 60/641.2–641.4; 290/44, 55
See application file for complete search history.

(56) References Cited

U.S. PATENT DOCUMENTS

| | | | | |
|---|---|---|---|---|
| 4,289,444 A | * | 9/1981 | Monk et al. | 415/4.2 |
| 4,319,865 A | * | 3/1982 | Richard | 416/41 |
| 7,984,613 B2 | * | 7/2011 | DuBois | 60/641.2 |
| 2011/0247328 A1 | * | 10/2011 | DuBois | 60/641.3 |
| 2011/0250069 A1 | * | 10/2011 | Quintal | 416/111 |

* cited by examiner

Primary Examiner — Hoang Nguyen

(57) ABSTRACT

The Geothermal Wind System is a hybrid power production system using geothermal transfer of heat between native rock and an air mass circulating between two or more portals of substantially different vertical elevations by use of the stack effect and the buoyancy of heated air or gravity pulling cooled air to turn one or more wind turbines which drive one or more generators. This wind speed can be improved by use of a venturi valve in close proximity to the turbine(s). A novel example of an aerodynamic, adjustable radial venturi is also herein incorporated. Two modes of the GWS are herein described, one used at shallow depths having geothermal temperatures approximating the average exterior climate, and the second used with geothermal temperatures found at greater depths at substantially higher than outside temperatures. The GWS is a non-polluting, non-carbon burning, non-water-dependent power production system easily implemented in third world countries.

1 Claim, 23 Drawing Sheets

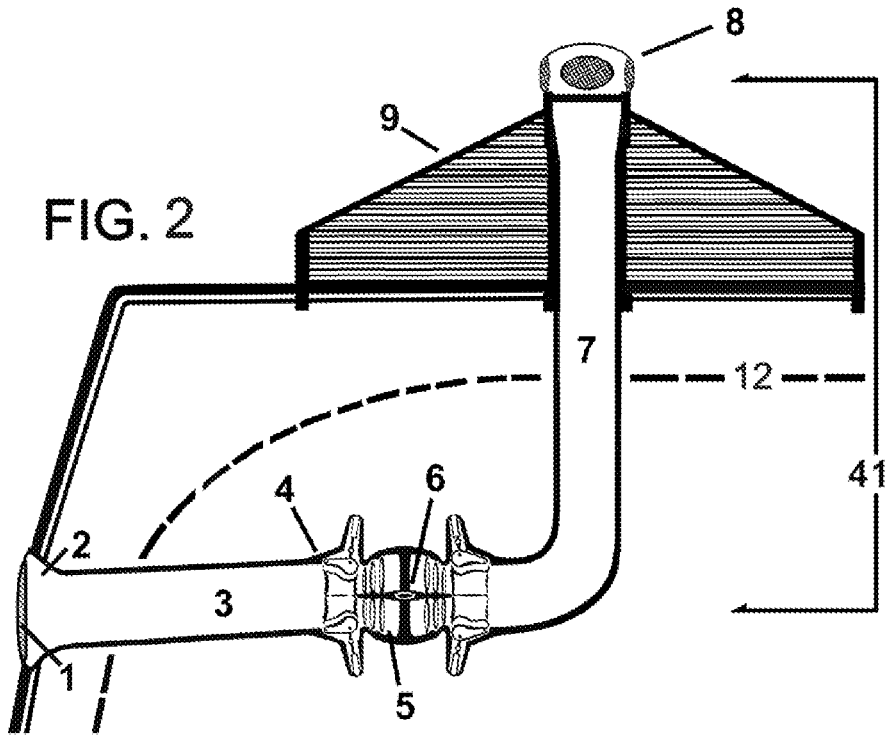

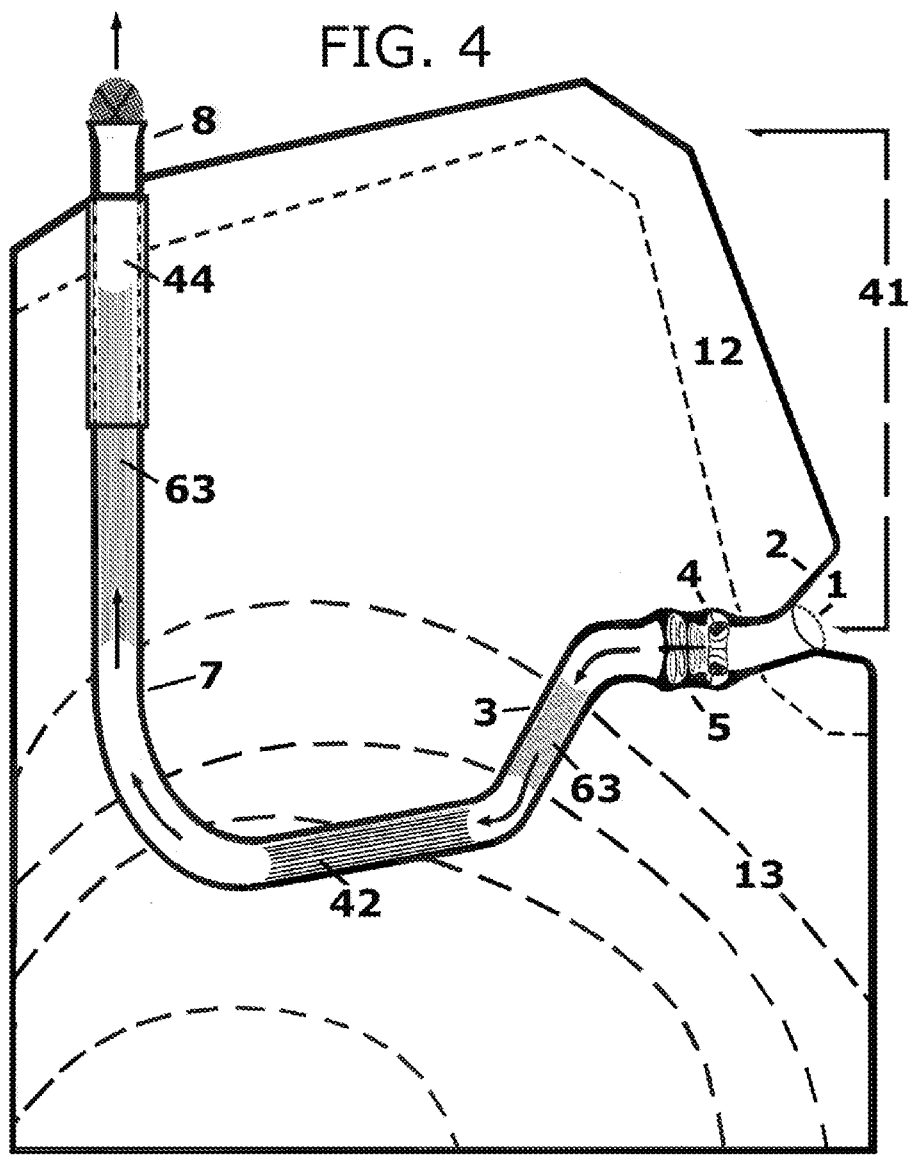

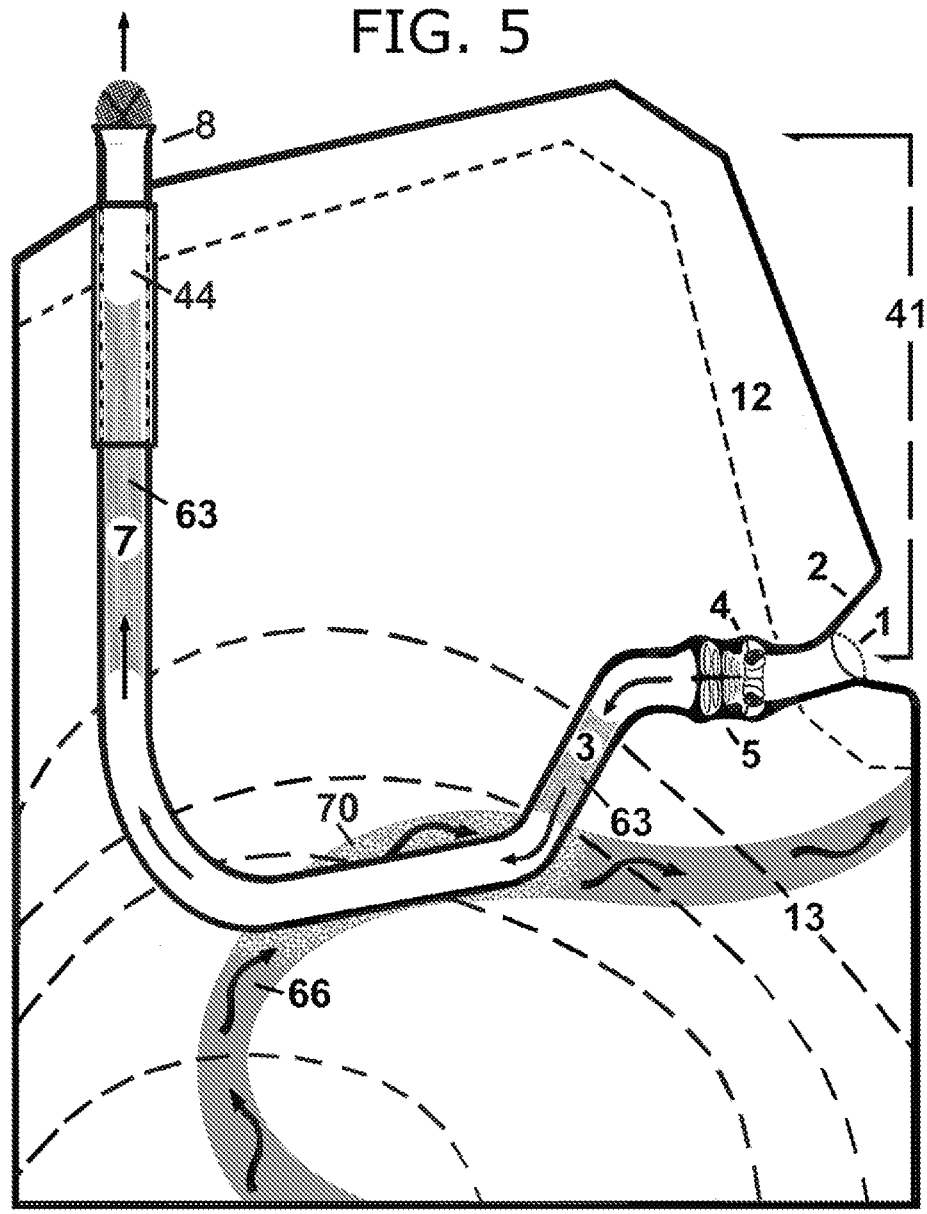

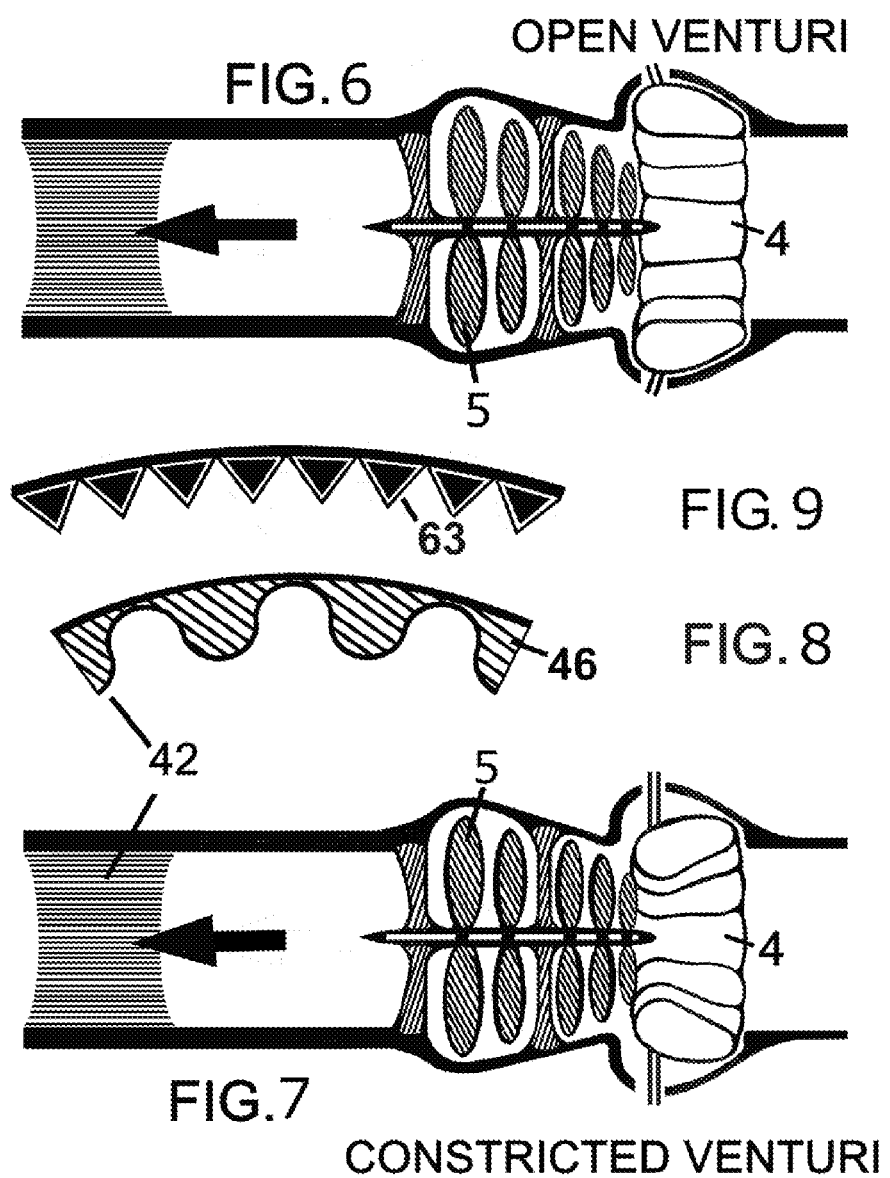

Figure 13:
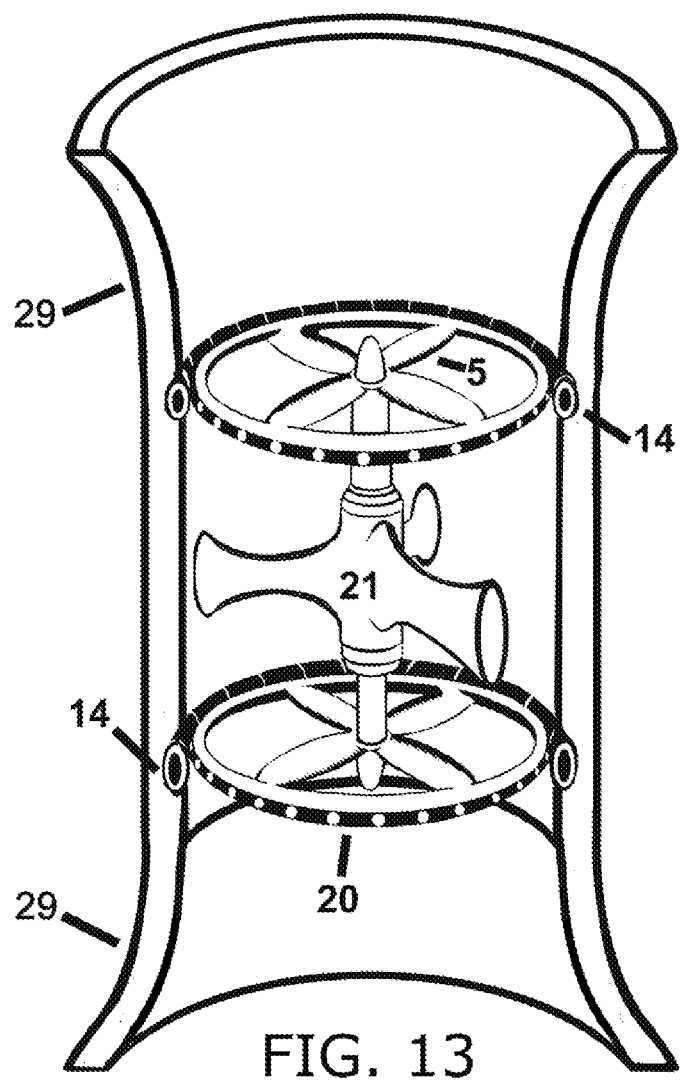

FIG. 10
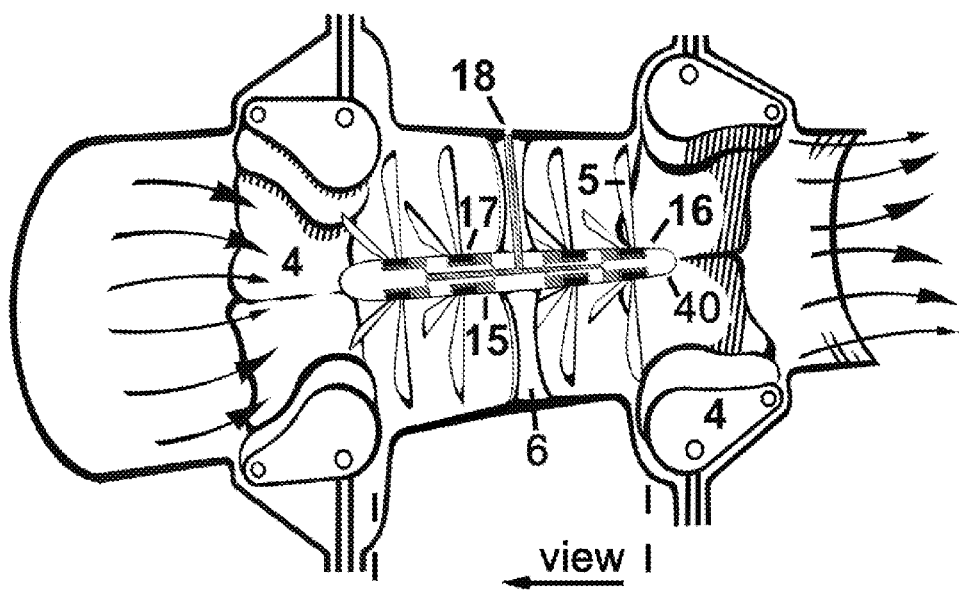
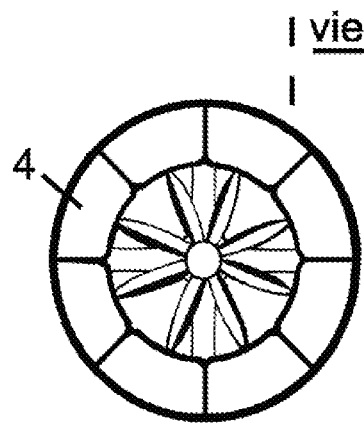
FIG. 11
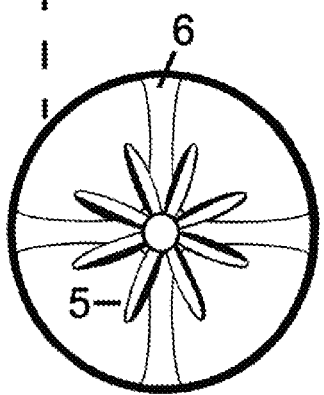
FIG. 12

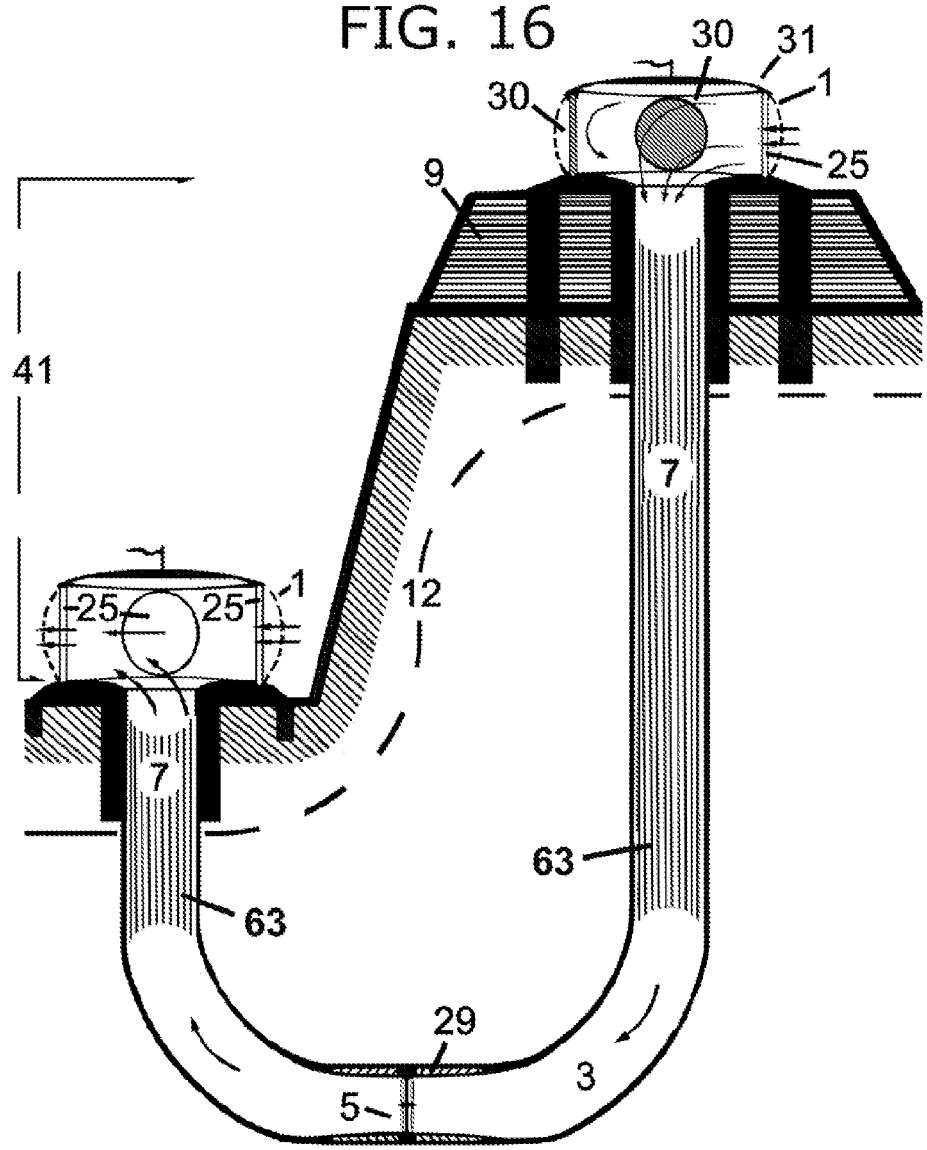

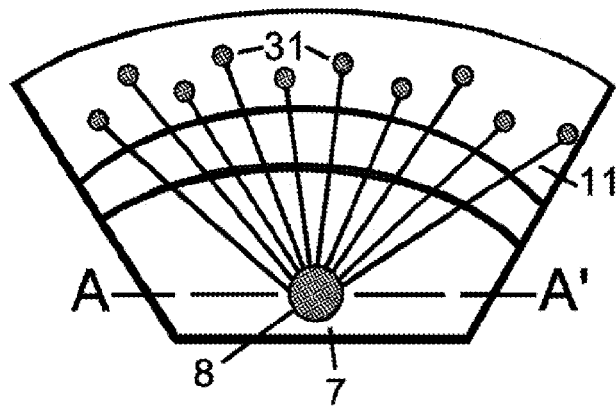
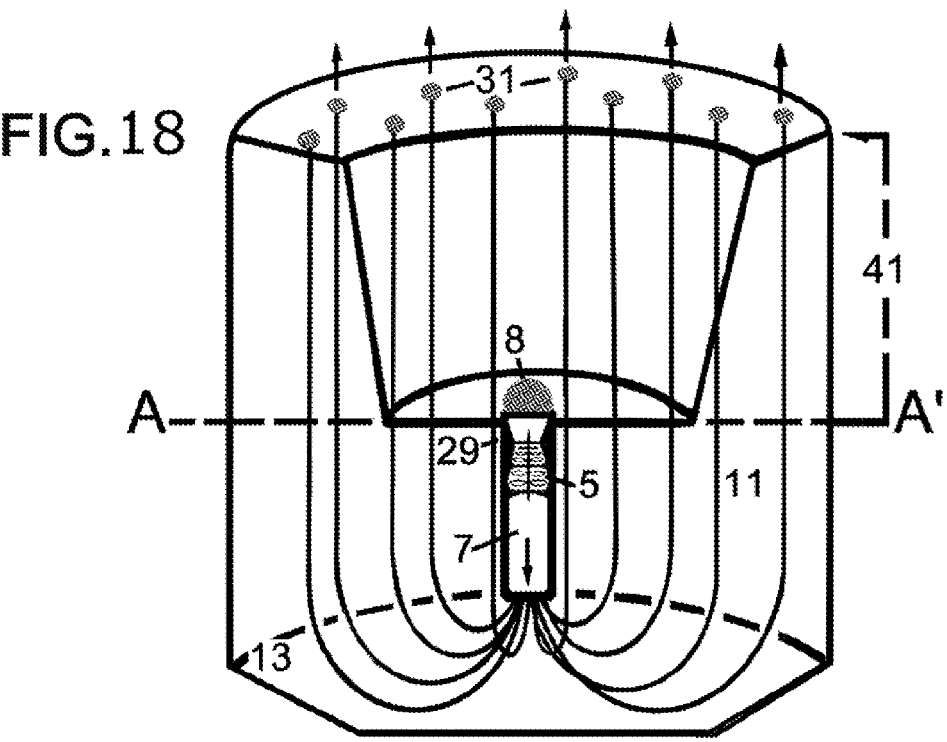

GEOTHERMAL WIND SYSTEM

BACKGROUND OF THE INVENTION

This invention relates to electrical power generation, more particularly to a novel hybrid power generating system to be known as the Geothermal Wind System (GWS), where a tunnel and shaft provide a circulating wind system to power turbines which generate electricity or by transferred mechanical energy turn electrical generators, using a passive geothermal heat exchange to create gravity induced buoyancy of air. There are two modes based on the same principle from which many embodiments of GWS can be created: The Low Temperature Mode harnesses geothermal temperature that is approximately the same as the yearly average of the outside temperature allowing bi-directional winds to flow upward or downward depending on the outside temperature. The High Temperature Mode is used where the geothermal temperature is greater than 49 C degrees or higher than the highest external temperature. This mode of high geothermal temperature always generates wind upward. In both of these modes the tunnel and the shaft act as a natural heat exchanger and allow the circulation of wind which propels one or more turbines connected to electrical generators.

An advantage of the wind tunnel herein depicted, is that a venturi restriction can be designed to focus the wind into a turbine. The present art teaches a novel Adjustable Radial Wind Venturi which allows the tunnel to constrict from all sides using six or more petals imposing the least wind resistance to focus higher or lower wind speeds onto the turbine for maximum performance.

Since buoyancy and gravity create the driving force, the greater the elevation difference between the two portals of the tunnel and shaft, the more powerful the winds and greater the electrical power generated. In areas where there is low elevation and low geothermal heat, the shaft can be extended as a stack with the spoil talus compacted as a mound around the stack for insulation.

INVESTIGATIONS INTO PREVIOUS ART

Scientific and Engineering Literature:
Cave Geology, Arthur N. Palmer, Cave Books, chap. 12, Cave Meteorology and Internal Weathering, pp 326-326; Cave Books, Dayton Ohio. 2007. Subsurface Ventilation Engineering: McPherson, M. Virginia Polytechnic Institute, 1993
The Future of Geothermal Energy, the Impact of Enhanced Geothermal Systems [EGS] on the United States in the $21^{st}$ Century, Mass. Institute for Technology, 2006
Equivalent Roughness for Pressure Drop Calculations in Mine Ventilation, Montecinos, C and Wallace K. $13^{th}$ US/North American Mine Ventilation Symposium, 2010
Reidy, Laural and Anderson, Greg, Drag Reduction for External and Internal Boundary Layers Using Riblets and Polymers, AAIA, January 1988 Viswamath, P. R. Aircraft Viscous Air Reduction using Riblets, Progress in Aerospace Science, 2002
Hybrid Wind Energy, Stack Effect and Cooling Towers using artificially induced wind:
U.S. Pat. No. 1,600,105, Jul. 6, 1923, Fonkiewitze; Power Generating Device: reveals a tower to harness the chimney effect, using a large inverted funnel focusing a stream of upward moving air onto screw-like turbine devise suspended in the tower, which turns a generator by force of the upward movement of heated air.

Note: One of the earliest Stack Effect Wind Generators. The means of heating the air is not specified. (Quote: "Any desired form of heater may be employed and properly located to accomplish this purpose.") No geothermal heat specified, nor does it extend underground.

U.S. Pat. No. 3,894,393, Jul. 15, 1975, Carlson, Lockheed Aircraft Corporation; Power generation through controlled convection (aeroelectric power generation): A method and means for the generation of power from a controlled air flow, wherein an enclosed air mass is cooled at high altitude below the temperature of the surrounding air using sprayed water. The air is isolated from the surrounding air by means of a large duct. The resulting cooler, denser air flows down the duct toward lower altitude, and the energy of the falling air mass is extracted by means of a turbine generator.
(Note: The water has to be pumped up the mountain to be sprayed. Air moves down the side of the mountain in an insulated conduit, weather permitting.) No geothermal heat specified.

U.S. Pat. No. 3,936,652, Feb. 3, 1976, Levine; Power System: Claim: A power system comprising, in combination, a tower containing a single interior duct having a vertical rise of at least one hundred meters, passages leading to the bottom of the duct, insulation lining said duct, heating coils mounted on the inner side of said insulation, said heating coils heating air to rise in said duct and draw additional air in through said passages, an atomic reactor, a working fluid circulating between said atomic reactor and said heating coils, generators, and rotatably mounted vanes disposed in said passages driven by air passing through said duct and said passages, said vanes driving said generators providing power.
Note: One figure shows a high duct within a mountain with an opening at the base in place of the Tower. Heat predominately provided by waste energy from power plant, otherwise downdraft during hot weather due to cooler geothermal temperatures would interfere with updraft from power plant. In one embodiment coils from geothermal heat or steam would heat the conduit, which was not included in the claim. Geothermal coils in a large air duct would not provide sufficient conduction of heat without unfeasibly long coils.

U.S. Pat. No. 3,979,597, Sep. 7, 1976; Durcker; Solar Power Plant: A solar energy power plant has a group of tall, vertical towers open at both ends and containing a plurality of wind-powered impellers mounted in vertically spaced locations within each tower, such that thermal updrafts in the tower drives the impellers. Vertically spaced, radially projecting heating chambers are mounted externally on each tower and each chamber has an air inlet to admit ambient air and an air outlet into the tower for heated air. The heated air entering the tower for the solar heating chambers forms an updraft for powering the impellers. The heating chambers also contain heat exchange tubes which connect with an insulated water reservoir in the base for the towers. No geothermal heat specified.

U.S. Pat. No. 4,016,725, Apr. 12, 1977; Fiss; Apparatus for Capturing lost Energy In a Thermoelectric Power Generating Plant: An impellor type wind turbine is suspended on a vertical axis within a modern power plant cooling tower to take advantage of heated water from the power plant transforming heat to the air which rises turning the turbine.
Note: this invention uses heated water to cause the air to rise as opposed to the previous art. No geothermal heat specified.

U.S. Pat. No. 4,497,177, Oct. 31, 1983; Anderson; Wind Generating Means: A system for obtaining air movement is disclosed which includes a basin of water covered by a solar energy-transmitting dome a spaced distance over the basin. The basin is located on a mountainside, adjacent a cliff, or the like. A surface type heat exchanger is located in the water adjacent the bottom of the basin, and an air inlet passage is provided having one end which terminates above the water surface beneath the dome and an opposite end connected to the heat exchanger. A long air outlet passage in the form of a flexible tube made of canvas, plastic sheet, or the like, is connected to the outlet from the heat exchanger, which outlet passage extends downwardly along the mountain slope, cliff, or the like. Venturi tubes are located along the air outlet passage, and vane-driven devices are positioned at the venturi tubes for operation by the cooled air flowing downwardly there through. An air valve at the bottom end of the air outlet passage controls the rate of air flow there through. The long air outlet passage is shielded from the sun to prevent solar heating of air flowing there through.

(Note: No geothermal heat specified.)

Ser. No. 06/287,195, Jun. 12, 1984; Collins, Wayne; Apparatus for and method of utilizing solar energy: The invention discloses an apparatus for generating electrical power using solar energy and an air mass rising from a mine shaft. The mine shaft has a generally inclined or vertical shaft, a shaft opening at approximately the ground level, and a lower end portion of the shaft includes an air inlet. A solar collector converts the sun's radiant energy into heat and heats a heat exchange or working fluid as it passes through the solar collector to increase its temperature.

(Note: Solar heating of fluid which is stored to exchange heat in the shaft to turn the turbine, not geothermal.)

U.S. Pat. No. 4,779,006 Oct. 18, 1988. Wortham: Hybrid Solar-wind Energy Conversion System. A system for producing electrical energy including a stack shaped and positioned generally as the letter "J" and having an intake portion, an exhaust portion and a conveying portion there between together with a vacuum producing mechanism associated with the exhaust portion for causing air to move through the stack whereby a generator responsive to the moving air generates electricity. Air movement is augmented by water injection and an exhaust fan powered by sterling engine.

(Note: Part of the conduit passes 1000 feet underground and the highest point is heated by reflected sunlight. The extreme depth is not explained since no use of geothermal energy is stated, and the depth is not part of the calculation of wind speed since the intakes are both at an equal level with the base of the tower and therefore do not extend the elevation difference between portals.)

U.S. Pat. No. 5,395,598, Mar. 7, 1999, Pruitt; Convection Towers: A tower or duel towers such that the air intakes from the upper end passing through sprayed water and exits passes through wind turbines at the lower end, or upper end of a second shorter tower, cleaning the air with sprayers and producing fresh water by condensers. In another embodiment, with high ambient humidity the air is blown in from the base to start the cycle and (processed sewer or salt) water sprayed down the tower causes condensation of the humid air which releases latent heat to increase the updraft allowing the turbine motors to kick in. Computer generations show one embodiment of the convection tower 500 meters high with a 200 meter radius and ambient temperature at 30 degrees C. and humidity of 50% can produce 85 MW with a pumping cost of 60 MW. Slack times mitigated by a horizontally spinning, hollow flywheel that propels liquid toward the circumference.

No geothermal heat specified.

U.S. Pat. No. 6,510,687 B1, Jan. 28, 2003, Zalaysky, et al. Renewable Resource Hydro Aero Power Generation Plant and Method of Generation of Hydro Aero Power: A power plant and method for the generation of power from flowing air utilizes a generally vertically extending duct having an inlet open to atmosphere at an elevation above an outlet. A spray system is mounted adjacent the inlet for spraying droplets of a predetermined amount of water into the air causing the air and droplet mixture to become cooler and denser than the outside air to create a down draft of fluid within the duct. A power system mounted adjacent the outlet recovers energy from the downdraft of fluid passing through it. The predetermined amount of water sprayed is greater than the amount of water that would theoretically and potentially evaporate in the air throughout the entire elevation over an unlimited time period using fresh water droplets. The power plant can also be synergistically combined with desalination systems and aquaculture. Calculations for a tower 1200 m high with a diameter of 400 m show a net average power of 460 MW.

Note: Highly specific to one site, widespread use of this system in other geographic areas may not be feasible. No geothermal heat specified.

U.S. Pat. No. 6,590,300, Jun. 8, 2003, Santiego; Cyclonic and Anti Cyclonic Conversion Tower: A tower with at least one convector, diffuser and deflector, having turbines or other power converter, has also an inverted conical trunk with air intake openings augmented by solar heated pools that contribute warm vaporous air.

Note: A complicated design with a number of problems, one being that humid air heated by solar pools will tend to condense as it cools, which may add heat, but also impede upward wind with downward rain. No geothermal heat specified.

U.S. Pat. No. 7,621,129, May 14, 2009, Dubois, A Power Generating System:

Hybrid solar-wind energy conversion system: geothermal power system for production of power, and in particular electrical energy, utilizing naturally occurring geothermal energy sources and a method for identifying and converting man-made and natural geological formations into a substantial source of energy and at the same time providing remediation of environmental and safety hazards. Utilizing surface air that is substantially cooler than the geothermal temperature of the subterranean cavern, an induced air flow will be produced. This naturally induced air flow will be harnessed and provide the energy to the system, power plants for production of electrical energy. The system includes a hydro-electric power system, a geothermal well, underground farms, heat recovery systems, a source of renewable biomass material, and air and water remediation systems.

Note: uses 6 foot diameter insulated conduit for intake air cooled by water. Geothermal heat warms the conduit where it enters a vortex machine and is further processed and cleaned. Using a stack to create flow of warm air would interfere with the stated air cooling process to drive air downward. A number of other processes are present in the art that have nothing to do with wind generation. See further discussion.

US 2010/0219637 A1, Sep. 2, 2010, Hovakimian; Compost Updraft Tower: A system and method for converting heat energy released by compostable matter into electricity through the use of a compost updraft tower. A compost updraft tower comprises a collector region that contains compostible matter, one or more towers that rise up through the collector region, and one or more turbines. The air within the collector region is heated by the energy released during the composting process, and the heated air flows through the collector region toward the open first end of one or more of the towers. The heated air then rises up through one or more of the towers to the open second end of the tower. The heated air flowing through the system drives turbines that generate electricity. In one embodiment the roof of the collector region is transparent to allow solar radiation to penetrate the collector region and heat air within.

Note: Possible methane release and spontaneous combustion. No geothermal heat specified.

Passive Wind Turbines: use no energy source other than wind, but with unconventional energy enhancers. They can be large ground mounted housings or more moderate shroud covered turbines which require smaller turbines than the typical tall long bladed systems. Energy enhancers include, infusers upwind to gather wind and diffusers downwind to create lower pressure behind the turbine, which is in the center, the housing often resembling a horizontal hourglass with open ends. Diffusers are the preferred use since they are not as vulnerable to wind gusts.

Most of these innovations may be applicable for underground use on the present invention since wind shear is not a factor. The combination of infuser and diffuser more or less defines a venturi chamber which is used in the present invention although with the addition of the ability to control the restriction to regulate the wind speed and thus the power generated.

U.S. Pat. No. 4,021,135, May 3, 1977, Pederson et al. Wind Turbine: A reaction type turbine using an augmenter produces a downstream vortex to increase the pressure differential.

U.S. Pat. No. 4,218,175, Aug. 19, 1980, Carpenter; Wind Turbine: The wind turbine is provided with a helical shaped blades fitting within a horizontal hourglass shaped shroud with open ends causing increased air pressure at the turbine and decreased pressure at the exit of the air.

U.S. Pat. No. 4,482,290, Nov. 13, 1984, Foreman & Gilbert; Diffuser for Augmenting a Wind Turbine: a diffuser having means for energizing the boundary layer at several locations along diffuser walls is improved by a short collar extending in a radial manor outward from the outlet of the diffuser.

U.S. Pat. No. 4,088,419, May 9, 1978, Hope et al. Air Operated Power Plant: A V-shaped pair of panels are arranged to converge on two impellers rotating on a vertical axis near the convergence of the panels at an air exit. The panels are shaped like vertical airfoils with the negative surface outward the structure creating negative air pressure behind the impellers while amplifying the pressure inside to more efficiently turn the impellers.

U.S. Pat. No. 4,508,973, Apr. 2, 1985, Payne; Wind Turbine Electric Generator: A jug shaped structure with air inlets divided in radial segments with openings extending to the height of the cylindrical wall. The inlet bases slope upward toward the center to form a cone, the inlet passages converging at the throat of a venturi at the bottle neck where the wind turbine is located. A wide mouth forms a diffuser where the air exits at the top of the structure. No heating or cooling factors are involved.

U.S. Pat. No. 4,600,360, Jul. 15, 1986, Quaterman; Wind Turbine Driven Generator:

A wind powered turbine is augmented by a segmented superstructure that forms a low pressure chamber for receiving turbine exhaust air, which is maintained at a below atmospheric pressure by action of wind blown over adjustable inverted airfoils.

U.S. Pat. No. 5,332,354, Jul. 26, 1994, Lamont, Wind Turbine Apparatus: An enclosure with closable openings which aligns housing with favorable wind direction, a decreasing width wind accelerator drives horizontally rotating vanes with air exhaust passing over the diameter of the circle to exit causing low pressure pull on the convex side of vanes increasing the efficiency.

U.S. Pat. No. 6,278,197 B1, Aug. 21, 2001, Appa; Wind turbine apparatus includes an upright mast with support bearings underlying and rotatably supporting a hub assembly having inner and outer coaxial shafts telescopically related but radially spaced to permit independent rotation about a generally horizontal axis. An armature winding is provided on the outer shaft and a plurality of dielectrically separated magnets are mounted on the inner shaft at a plurality of circumferentially spaced locations. A first set of rotor blades is mounted on the inner shaft at a plurality of circumferentially spaced locations, the rotor blades extending radially away from the axis of rotation and positioned on the inner shaft for rotating the inner shaft in a first direction about the axis of rotation when subjected to wind-induced air flow. A second set of rotor blades is similarly mounted on the outer shaft axially spaced from the first set of rotor blades for rotating the outer shaft about the axis of rotation in an opposite direction. The hub assembly may be selectively positioned in azimuth so that the first set of rotor blades is relatively closer to the wind-induced air flow, or windward, and the second set of rotor blades is relatively farther from the wind-induced air flow, or leeward. Electrical power is generated as the armature winding on the outer shaft and the plurality of magnets on the inner shaft rotate in opposite directions and power transfer apparatus is provided for drawing off the electrical power from the hub assembly to a distant receiver.

U.S. Pat. No. 6,717,285, Apr. 6, 2004, Ferraro, Michael; Multiple collector wind driven power generating device: A wind powered generating device comprises a tube cluster, a collector assembly, and a turbine assembly. The collector assemblies utilize sails that can be rotated to direct wind down through an inlet tube to a central outlet tube. The central outlet tube is narrowed at a portion, and a turbine is mounted at this narrowed portion to take advantage of the Venturi effect that accelerates the air as it passes the turbine. This permits reliable and efficient operation in areas that were not formerly considered windy enough to be economically feasible for the deployment of wind powered generating devices. Alternative embodiments of the invention include mechanisms for dealing with violent weather conditions, a first of which allows excess wind to bleed off beneath and between the sails, and a second which collapses and covers the sail with a protective sheath/sock.

U.S. Pat. No. 7,230,348 B2, Jun. 12, 2007, Poole; Infuser Augmented Vertical Wind Turbine Electrical Generating System: The system generates power by having a vertical "savonius type" rotating turbine with a wind rotational air inlet duct having multiple fixed pitch blades, and an equal number of infuser shaped guides.

Ser. No. 11/627,770, Jul. 31, 2008; Papp, Eugene: A system for generating electricity with continuous reusable energy by utilizing the venturi effect to capture wind power and energize at least one generator to transfer mechanical energy to electrical energy, said system comprising: a) a substantially hollow base structure; b) a plurality of hollow cylindrical vertical towers having a first open end leading into said base and a second open end communicating with the ambient environment; c) an air intake venturi conduit extending horizontally from said base and in interior communication therewith, said conduit having a central venturi throat with a narrower diameter than the opposing ends thereof; d) an undershot turbine wheel disposed within said venture throat; e) a pressure unit for pressurizing an element and storing the pressurized contents; f) a power shaft communicating between said turbine wheel and said power unit; g) a generator having a rotor extending there from; and h) means for utilizing said pressurized element to rotate said rotor and energize the generator to transfer the mechanical energy captured by the air flow and transferring its electrical energy.

U.S. Pat. No. 7,550,864 B2, Jun. 23, 2009, Anderson; Wind Turbine: A rotor comprising a plurality of blades and a ring shaped aerofoil connecting the outer tip of the blades in the manner of the rim of a wheel. It also contains a rotational component that self-mitigates for changes in wind direction.

US2009/028009 A1, Nov. 12, 2009, Brock; A Wind Turbine with Different Sized Blades for Diffuser Augmented Wind Turbine Assembly: A diffuser augmenter with a plurality of blades increases efficiency of wind turbine at variable speeds. Cone shaped housing increasing in circumference at exit creates lower pressure at exit path for a higher pressure differential on blades.

2010/0084867, Apr. 8, 2010, Sato; Wind Power Generator: The wind power generator includes: a wind tunnel formed by a cylindrical member erected on a foundation in a vertical direction; a plurality of wind-collecting plates that extends from a circumferential wall of the cylindrical member in directions normal to the circumferential wall; a plurality of upper and lower guide plates provided between the wind-collecting plates; a plurality of wind inlets that introduces wind collected by the wind-collecting plates into the wind tunnel; back-flow preventing means that allow only the flow of wind blowing from the outside of the cylindrical member into the inside of the cylindrical member; a turbine that is driven by wind blowing out from one end of the wind tunnel, and power generator that is driven by the turbine.
Note: a large tower passively forces wind downward to turbines at basement level.
No geothermal heat specified.

DISCUSSIONS OF PREVIOUS INVENTIONS

The earliest use of the stack effect to drive a wind turbine was by Fonkiewitze U.S. Pat. No. 1,600,105, in 1923, but he did not mention geothermal energy, depicting instead a chimney without specifying the energy that drove the wind. Others have depicted towers or other structures with turbines driven by falling cool air, solar, air cooled by sprayed water and composting methane.

Of the previously cited patents, only two refer to geothermal heating of air to create power from wind driven turbines. In 1976 Levine with his depiction of a tower with wind driven turbines using heated air from a nuclear reactor or other means which may include coils of heated fluid pumped from underground geothermal rock. In the 2009, DuBois proposes air sprayed water falling into mine shaft within a duct where it mixes with warmer geothermal air from another duct to spiral in a "cyclonic chamber" before passing through turbines to be expelled through another duct to the atmosphere. Both of these previous patents are substantially different from this present invention and possibly less feasible.

In 1976 Levine depicted a tower with wind driven turbines using heated air from a nuclear reactor or other means which could include coils of heated fluid pumped from underground geothermal rock. Although he does show a tunnel and shaft (FIG. 5) using an unspecified source of heat as an embodiment to substitute for previously depicted towers, there is no stated use of direct geothermal heating as in Claim 1 Paragraph 2 of the present invention. Nor is geothermal cooling and bidirectional flow shown, as in Claim 1, Paragraph 3 of the present invention.

FIG. 10 of the patent by Levine does show air heated by coils of hot fluid pumped from a geothermal well powering an updraft into a tower. "Coils 94 have a hot working fluid pumped through them by pump 95 from a deep well 96 which has the working fluid circulated through it to pick up geothermal heat."

By using this method, if he even considered it, Levine may have overestimated the conductivity of heat through air (zero C=0.0243 W/M to 300 C=0.0454 W/M) and therefore underestimated the length of the coil necessary to heat the moving air. Since the heat is exchanged from a moving liquid to a solid then to a moving gas, the more power to be produced, the larger the diameter of the tunnel needed and or the faster the wind speed, requiring a longer conduction tunnel for heat exchange and also much longer coils. At some point, the pumping of fluid through coils will cost more energy than that produced. For instance to heat the airflow 200 degrees F. (94 C) with maximum effectiveness for the present invention in which the preferred embodiment is cylindrical passage 12 meters in diameter, if the elevation of the portals was from 610 M to 914 M the length of the heat exchange tunnel 260 to 318 meters long (calculation of conduction length is discussed in paragraph 65 below). If the heat exchange was 300 meters long and 12 meters diameter and the hot fluid coil was wrapped only two coils per meter at pi*12*300*2 would be 22,615 meters of coil plus 300 meters back to the bore hole and to the depth to the geothermal gradient. By running the air tunnel through the geothermal source as taught by the present art, the buoyancy of air becomes the pump. In any case, such previous method is not the art depicted by the present art.

In an ambitious patent of 2009, DuBois proposes cold air falling into a mine shaft within a duct where it eventually mixes with warmer geothermal air from another duct to spiral in a "cyclonic chamber" while passing through turbines to be expelled through another duct to the atmosphere. A general technical problem with the numerous inventions having to do with artificial whirlwinds is that tornadoes, water spouts and other twisters are byproducts of greater forces and energies due to wind shear and massive weather fronts. They are a form of dissipation of those high energy accumulations, as is lightening. By trying to reverse engineer a byproduct of weather, the inventor attempts get more energy out of less, thus reversing the laws of thermodynamics.

Although Dubois mentions the stack effect in the Summary of the Invention, his meaning is not thoroughly explained: "The air induction chamber includes features within the chamber to create a vortex of spinning air as it enters the insulated intake conduit. This is used to create the most suction of atmospheric air and higher velocity as the air begins its descent. The descending airflow naturally increases in velocity. This is called a "stack-effect", and is similar to the whoosh of air one feels when elevator doors open in a high rise-building . . . . "

This previous depiction does not show use of the "Stack effect" as depicted by the present claim of Claim 1, Paragraph 2. Instead Dubois teaches in his Claim 1 of the previous patent " . . . air entering said first air inlet passing through the ductwork is heated substantially to the geothermal temperature; and said ambient temperature is substantially cooler than said geothermal temperature;" and further, " . . . a second insulated conduit defining a second flow path for admitting cool ambient air from a second air inlet, located at the surface of the earth, to said cyclonic chamber . . . . " and in claim 12, "the ductwork is stacked and coiled back and forth upon itself" to allow enough length for the conductivity of heat, although wind resistance may be a problem.

Where the stack effect depicted in the present invention would normally propel warmer air up to the highest outlet. The elevation differences between conduit entries are not specified in the patent claims but in FIG. 12b are shown with airflow arrows at inlets at the highest elevations inletting cold air as explained: "Surface level (cold) air is captured in an air induction chamber and enters a substantially vertical intake shaft located beneath the surface of the earth . . . .

The means of allowing this cold air to drop downward is the air induction chamber shown in FIGS. 2 & 3 and described in the Detailed Description of the Invention: The air induction chamber 11, shown in greater detail in FIG. 3 consists of an insulated dome or roof 12 an air intake 13 an air amplifier 14. The surface level ambient air is captured in an air induction chamber 11 and is then induced into a vortex generating bowl 15 which is fluidly connected to insulated intake conduit 20 located within the substantially vertical insulated intake shaft . . . . Also within the intake chamber is an air compressor (not illustrated) and an air amplifier 14. Using these as starting devices within the chamber, the suction of atmospheric air through the vents is optimized. A vortex bowl 15 is used to create a spinning motion to the air, sealing pressurizing and increasing the velocity of the airflow as it enters the air intake conduit. The substantially vertical intake shaft 2 and the insulated intake conduit mounted therein can descend many hundreds of feet into the cavern 3 where the cold air will be warmed . . . . " These quotes show a proposed flow path which is exactly the opposite of the stack effect.

All this flow is contained within conduits and eventually reaches the 'Cyclonic Chamber': "The geothermal power system of claim 1, wherein a turbine chamber is positioned adjacent to and in fluid communication with the cyclonic chamber, said turbine chamber containing a vertical axis wind turbine, said turbine including blades that extend into the cyclonic chamber."

This previous patent does not teach of a natural downdraft or bidirectional winds as does present Claim 1, Paragraph 3 & 4, presumably due to a location of higher geothermal temperature than any outside weather, but it also does not foretell the present Paragraph 5 which teaches of hot wind rising in an upward unidirectional flow through the highest portal where outside temperatures are colder. It is also clear that the previous patent by Dubois does not precede Claim 1, Paragraph 6 of the present invention presenting passages in rock created expressly for use in geothermal wind power, since the previous patent is limited to reusing abandoned mines and also proposes other processes such as growing plants, filtering carbon, steam generators and hydro power.

To conclude, while geothermal heat is involved, wind is involved and turbines are involved, U.S. Pat. No. 7,621,129, by Dubois, puts these factors together in a more complicated and distinctly different way than the present invention, and in attempting to create a cyclonic effect, abandons any idea of using the stack effect. Both the above inventions miss the advantage of the present novel invention which uses the native rock as a passive heat exchanger and natural buoyancy of air as a self-sustaining pump.

Adjustable Venturi Valves

U.S. Pat. No. 3,799,502, Mar. 26, 1974, Jorg, P. B.; Adjustable Venturi Throat for the Purification of Blast Furnace Gases: This disclosure teaches an adjustable venturi throat for dust purification of blast furnace gases, operating at up to sonic velocities with a substantially constant pressure drop, adjusted by dampers having a length of approximately one half the width of the throat. In a preferred embodiment the dampers are streamlined in shape, with the narrower ends swinging in mirror images to form a nozzle curve. The ends may be adapted to form a roller-type closure when the dampers are fully closed.

U.S. Pat. No. 3,894,563, Jul. 15, 1975, Pausch, Josef; Venturi Apparatus: A Venturi apparatus and method used with a cyclone separator to separate particulates, fumes and waste gases from gas, as air. The apparatus has a housing having a generally rectangular chamber through which the gas and particulates flow. The housing has converging side walls forming an elongated rectangular Venturi throat. Plates movably located in the chamber between the side walls are spaced from each other to control the length of the Venturi throat. Controls connected to the plates are operable to move the plates relative to each other to change the length of the Venturi throat. The width of the Venturi throat is determined by the spacing of the side walls and is not changed by movement of the plates.

Comments:

The secondary claimed Adjustable Radial Venturi has no predecessor in the art. Most venturi valves if adjustable were used in smaller air and fuel delivery systems and were more like the nozzle on a water hose. An Adjustable Venturi Throat for the Purification of Blast Furnace Gases, by Jorg is the most similar but is composed of two equal swinging doors which are rounded on the ends fitting a rectangular nozzle, as opposed to the present invention which uses six or more petal shaped flaps in a circular opening in order to focus a circular airflow into a restricted circular airflow.

U.S. Pat. No. 6,717,285, Apr. 6, 2004, Ferraro, Michael; Multiple collector wind driven power generating device: A wind powered generating device comprises a tube cluster, a collector assembly, and a turbine assembly. The collector assemblies utilize sails that can be rotated to direct wind down through an inlet tube to a central outlet tube. The device sends air upwardly one way without adjustability for downdrafts since geothermal energy is not involved.

Ser. No. 11/627,770, Jul. 31, 2008; Papp, Eugene uses several chimneys to draw wind upward by creation of low pressure on top. The wind is drawn through a lower tube with a venturi. Likewise the device is one way without adjustability since vertically bidirectional winds are not involved.

Aerodynamic Enhancements:

U.S. Pat. No. 5,445,095, Jul. 29, 1995, Reed, J. C. & Bushnell, D. M. Polymer/Riblet Combination for Hydrodynamic Skin Friction Reduction: A process for reducing skin friction and inhibiting the effects of liquid turbulence in a system involving the flow of a liquid along the surface of a body, e.g. a marine vehicle, includes injecting a drag reducing polymer into the valleys of adjacent, evenly spaced, longitudinal grooves extending along the length of the surface of the body, so that the rate of diffusion of the polymer from individual grooves into the liquid flow is predictably controlled by the groove dimensions. When the polymer has diffused over the tips of the grooves into the near wall region of the boundary layer, the polymer effectively reduces the turbulent skin friction. A substantial drag reducing effect is achieved with fewer polymers than must be used to lower skin friction when the surface of the body is smooth.

U.S. Pat. No. 634,579 B1, Feb. 12, 2002 McClure, Paul D. Stream Wise Variable Height Riblets for Reducing Skin Friction: A series of parallel riblets extend from a smooth, aerodynamic surface for reducing the skin friction drag of the surface an airstream flows around it. The riblets extend longitudinally along the surface and have a triangular cross-section in the transverse direction. The apex of the cross-section defines a continuous, undulated ridge with peaks and valleys. Measured from the surface, the peaks have a greater height than the valleys. The interaction of the riblets with the structure of the turbulent boundary layer of the airstream reduces the skin friction drag coefficient of the surface by approximately 12% over an identical smooth surface without the riblets. This reduction occurs despite the significant increase in wetted area of the riblet-covered surface over the smooth surface U.S. Pat. No. 0,073,710 A1, Aug. 25, 2009 Rawlings, D. et al Structurally Designed Aerodynamic Riblets: An array of aerodynamic riblets is formed with a surface layer for adhering to an aerodynamic surface and a plurality of riblet tips having a parabolic cross section extending from the surface layer.

U.S. Pat. No. 0,187,359 A1, Jul. 21, 2010 Rawlings, Diane C. and Malone, K. Rigid Tipped Riblets: A multilayer construction for aerodynamic riblets includes a first layer composed of a material with protuberances, the first layer material exhibiting a first characteristic having long-term durability and a second layer composed of a material, exhibiting a second characteristic with capability for adherence to a surface.

U.S. Pat. No. 0,187,361 A1, Jul. 21, 2010 Rawlings, D. et al Amorphous Metal Riblets: An array of aerodynamic riblets is created by a plurality of high stiffness tips with a layer supporting the tips in predetermined spaced relation and adhering the tips to a vehicle surface.

SUMMERY OF THE INVENTION

1. The Geothermal Wind System (GWS) is a hybrid power generating system where a tunnel and shaft provide rapidly circulating wind to power turbines and generate electricity. This system is non-polluting and non-carbon producing, non-water using, with low noise emissions and a small footprint with widespread possible usage. It is expected the Geothermal Wind System can be used widely enough to provide recharging power for electric cars and clean power for industry, military bases and isolated communities, particularly in mountainous terrains. The turbines, hidden underground would not endanger birds and wildlife and would be less intrusive to residents. The Geothermal Wind System will help provide cheaper energy costs while diversifying and decentralizing the energy grid to protect against disruptions caused by natural or human disasters.

2. The Geothermal Wind System is based on a tunnel and shaft underground structure where geothermal heat provides a temperature differential between inside and outside atmosphere for circulating air. The tunnel walls become a natural heat exchanger for incoming air, which produces wind that rises or falls due to buoyancy and gravity allowing energy to be captured by wind turbines.

3. The underground wind production provides design and modification opportunities to control and enhance the wind velocity such as a variable radial venturi, a wind focusing device included in this art. While energy production has been previously limited when outside wind velocity has exceeded the structural capability of the towers and turbines, this underground wind can be slowed down or sped up to maintain velocity within limits. (Early prototypes of this system may be used as wind tunnels to test new designs for future turbines.) Calculations estimate that using a constant geothermal gradient of 66 degrees C. (150 F) at a geothermal gradient of 30 C/km with a shaft 914 meters (3000 feet) higher than the tunnel opening, the entire passage being 12 meters in diameter while using a venturi constriction half that diameter can produce 13.8 MW of power using internal coefficient of friction at 0.002 and shock loss factors and after the 44% Betz factor and mechanical inefficiencies are introduced.

4. There are two modes to the system to accommodate two geologic settings. From these two modes many embodiments may be applied. The first uses a low depth, stable geothermal gradient found within 60 meters (200 feet) of the surface. Wind flows up or down depending on whether the outside temperature is above or below the static geothermal temperature which is approximately the average surface temperature.

5. The second mode using a higher geothermal gradient takes advantage of hot spots with moderately higher temperatures than that of the surface. Water and steam are not needed, so temperatures of 65.6 C (150 F) or greater will produce an upward flow of wind increasing in speed as outside temperatures drop. (Note: in steam powered, binary EGS systems, temperatures below 150 C are considered cool, but for present purposes any temperature above the highest local surface temperature is considered hot.) In both modes the increase vertical distances between the two portals increases wind power, so greater topographic relief and higher investment in excavation allows greater power production. In both modes, as the diameter of the tunnel increases and the area of the windswept turbine blades increases, the power increases, but since the power output is proportional to the wind speed cubed, placing a venturi constriction at the turbines in the larger tunnel, the power can be greatly increased. Both modes would also be useful in arid locations since water is not needed to create steam or in a heat exchange.

6. The low temperature mode is the least expensive because less excavation is required. It is most widely applicable, and has less energy loss due to air friction, but produces less energy per unit unless a substantial vertical difference between portals mitigates the lesser geothermal temperatures. Although more reliable than most surface winds, The GWS occasionally has slack periods when inside and outside temperatures are equal. In this mode the geothermal heat, generally the median of yearly temperatures, between ten to sixteen Celsius (50 to 60 degrees F.) is used to create duel cycles of wind, the first on cool days, when cool air is drawn through a low portal and is warmed enough to rise to an upper portal, while being displaced by an inflow of more cold air through the lower portal. The second cycle occurs on warm days when the air cooled inside the shaft falls to escape through the lower portal while pulling warm air through the upper portal to be cooled. The wind speed increases with the difference between inside and outside temperatures and the greater difference between elevations of the two openings. If the static geothermal temperature is 10 C (50 F), then a −18 C (zero F) outside temperature will produce wind speed nearly equal to that at 37.8 C (100 F) outside temperature. These two extremities would produce a higher power production than all temperatures between them, which means the power rise would parallel the demand in summer and could also be proportional to the demand in winter if electricity was used for heating. This mode could also be used to modify existing power stations during peak demand.

7. It has been calculated that using a shaft and tunnel design with a vertical extent of 305 meters (1000 ft), a diameter of 12 meters and a geothermal temperature of 10 degrees C. (50 F) with a venturi constriction having a circular cross section, a diameter of 6 meters and a single turbine with a blade diameter of 6 meters while accounting for Betz and mechanical inefficiencies of 44%, could produce an average of 1.36 megawatts of power and a maximum of 2.99 MW at a temperature of −23.2 C (−10 F) and at 43.4 C (110 F) factoring the internal surface coefficient of friction at 0.0035, drag and shock loss. The averages are calculated in ten degree Fahrenheit increments between the two extremes, while actual daily and nightly power may greatly exceed the normal. Using these same parameters but calculating for a vertical distance between portals of 1219 meters (4000 ft.), four times the previous distance, the power produced would be an average of 10.36 MW with peaks of 22.4 MW at 20.29 C (−10 F) and at 43.4 C (110 F). So by the above criteria, four times the height equals about seven times the average power. Unfortunately this ratio does not hold true for higher geothermal temperatures due to friction and turbulence imposed by longer wind conduits, as will be shown.

8. A number of strategies are possible to boost the power of low geothermal and low elevation systems including, but not limited to, towers extending low elevation shafts upward, duel or multiple bi-directional turbines, flywheel generating systems, adjustable venturi systems, and using outside structures as infusers and diffusers to take advantage of prevailing winds. It is envisioned that pluralities of GWS will be set up in linear arrays along expressways, around cities and along geographic escarpments, standing beside conventional wind farms or solar plants, each providing backup for low levels or down time of the others.

9. The second mode of Geothermal Wind Power could be used in locations where the higher geothermal gradient is near the surface or where deeper shafts can be excavated. Geothermal hotspots may be used where the geothermal temperature would exceed the highest outside temperatures in which case a single cycle would provide a constantly upward wind. These geothermal temperatures need only range between 120 F to 200 F degrees, less than steam derived geothermal energy or Enhanced Geothermal Systems. More expense is needed for deep drilling and tunnel boring, but once set up no thermal coils, no pumping or fluid is necessary, and since air has a lower conductivity than most earthen elements there is less depletion of the geothermal energy. This mode has less widespread application, but with improvements in geothermal mapping and drilling systems, there is great potential for new areas of moderately high geothermal heat. In the majority of locations, the geothermal gradient reaches stasis between fifteen to sixty one meters (fifty to two hundred feet in depth) depending on such things as underground water, thermal conductivity of the rock and prehistory of glacial or tectonic activity. At lower depths the geothermal gradient usually increases about, 15-30° C./km or 0.82-1.65° F./100 ft. A 2005 Map by the Idaho National Laboratory of Geothermal Technologies using data from the Southern Methodist Geothermal Lab shows widespread geothermal temperatures of 50 C degrees (120 F) or more across 90% of the Continental United States at a depth of 3000 meters and some 75% of the US holding temperatures of 75 C (167 F) or more at that depth. While these temperatures are insignificant for pumped geothermal energy, it will be shown that GWS can harvest energy from temperatures as low as 10 C (50 F) within 60 meters of the surface.

10. Despite the extra excavation and turbulence caused by friction along the length of tunnels and shafts, computer models for the low mode 10 C configuration, the average power can be increased from 1.4 to 3.8 megawatts by increasing the elevation difference from 305 M (1000 ft.) to 610 (2000 ft) between entry and exit portals. Likewise by an additional 305 M the power is increased to 6.8 MW, and extending that difference to 1219 M produces a high buoyancy chimney effect generating an average 10.36 MW. This Elevation Difference also referred to as Shaft Depth whereby the chimney effect is calculated, does not include additional depth to the target gradient below the lowest portal. Higher thermal gradients such as 50 C/km would allow higher temperatures to be reached at shallower depths, meaning 120 F could be found within one kilometer and 200 F could be found within two kilometers, doubling the power that could be produced from 3.5 km by subtracting the extra distance the wind has to travel. The 50 C/km gradient can be found in about a third of the states in the USA, mostly in the western basin and range areas. The highest Geothermal gradients in the 48 states are in Yellowstone Park with gradients of more than 70/km, but Hawaii and Alaska may hold greater geothermal promise.

11. As the temperature difference is increased, the power is also increased. A change in the outside temperature can increase or decrease the power, but by building a GWS unit where higher geothermal temperature can be obtained, can increase the average power overall. A GWS with a diameter of 12 meters with a vertical extent of 614 M (3000 ft) with a geothermal temperature of 49 C (120 F) at a gradient of 40 C/km could produce an average of 12.99 MW and maximum, but changing only the geothermal temperature by boring a little farther to 66 C (150 F) produces 16.12 MW, but boring still farther to 94 C (200 F) only produces 15.6 MW due to friction and turbulence of the longer total passage length of 5701 M compared to 4311 M for 66 C and 3475 M for 49 C. These distances include Elevation differences, heat exchange length and target depth to the geothermal temperature doubled for the inward and outward airways.

12. Friction and resulting turbulence will be a factor in slowing the velocity of the wind, so ideally the structure would be circular or elliptical in cross section with smooth walls extending diagonally from the lower portal to the upper one. In practicality it may be less costly to create a horizontal or upwardly sloping tunnel met by a vertical shaft or shafts. In some high heat geothermal settings, it may be required to bore downward until suitable temperatures are met, and then drill exhaust shafts to meet the tunnel. The area of the cross section of the tunnel is the most affecting variable where the elevation is limited and earth temperature is low. The limitations on the diameter of the tunnel will depend on the cost and method used to create it. Modern boring machines can create tunnels in excess of 12 meter diameters so calculations of the preferred embodiment were based on a 12 meter diameter shaft and tunnel.

13. In lower elevation topography, vertical extent of the structure can be extended by use of a stack surrounded by a mound taken from the spoils of tunneling (or other forms of insulation), which could be landscaped as a park, or the stack could be enclosed by a building. Such additions would provide insulation and structural integrity to the stack, lowering cost adding value.

14. Wind speeds can be greatly increased or moderated by use of an adjustable venturi valve to constrict the tunnel directly in front of the windward turbine while a second leeward one is opened for the bi-directional Low Mode. The High Temperature mode only needs one venturi since the wind inside is unidirectional. (Sheet One.)

15. In the case of these deep tunnels, besides the single shaft returning hot air to the surface, a number of smaller diameter drilled holes from the most elevated surface could converge on the inlet tunnel to provide outlets. These numerous outlets would not only solve the logistical problem of a very deep pit, they would diffuse the blowing air. The large inlet tunnel would slope downward to where the temperature would reach around 66 degrees C. (150 F) to 94 C (200 C) degrees more than the maximum outside temperature. Modern drills and boring equipment are now suited to accomplish this task, although overcoming increased geothermal heat may be a challenge. A number of ore producing mines descend to temperatures around 120 F (49 C). In these high heat modes, the turbine system will be placed within a hundred or so meters of the lower entrance to allow self cooling by incoming air.

16. Another embodiment of a similar array would have the multiple drilled shafts extending down to the target geothermal gradient then curve upward to converge on a central shaft leading to a lower portal in a valley or other declination. The turbine would be oriented vertically, with air passing down the lower portal to turn the turbine, pulled by heated air flowing upward to the plurality of upper portals.

17. An alternative way of providing the heat exchange tunnel with geothermal energy is to place the passage within the reach geothermal waters thereby allowing the heat to come to the tunnel, saving additional and additional frictional surface. In such case the airway would be sealed from the waters. Although the USGS has a list of more than 1600 warm and hot springs having temperatures as high as 94 C (200 F), such circumstances are relatively rare, and problematic from an engineering standpoint.

18. Apertures could allow the tunnels to be closed for maintenance, and small bypass tunnels could be opened to allow some airflow. All entrances would be contained within large smooth funnels ideally made of concrete to allow passage of air with the least amount of dust. The funnels will be covered with outwardly convex fauna grates to prevent harm to wildlife including bats and birds. The upper openings may be extended several meters and surrounded by fencing, as well, to prevent human or larger wildlife endangerment.

19. Geothermal wind circulation is a natural occurring phenomena found in large caves with entrances located at vertically separated elevations. The inspiration for this invention came from surveying large cave systems. Although most caves are not engineered for a high velocity wind system, there are many caves named Windy, Wind Cave or Blowing Cave and similar names. Most have low wind velocities due to the wind resistance of collapse debris and small cross-sections, although higher wind velocities are often found in restrictions which become irregular venturi chokes. Wind Cave of South Dakota has such a choke where 70 MPH winds have been measured.

20. Caves may also have air leaks through unidentifiable openings or cracks or have temperature fluctuations due to inflowing water. Water seepage may also be detrimental to power generation. Most caves would not make a good environment for a wind turbine due to possibilities of flood, and the habitation of bats and other endangered species. The same can be said for many mines which even in good condition have numerous obstructions and typical wall coefficient of friction of about fifty times greater than that necessary to promote high wind velocity. Side passages create further turbulence problems. Karst terrain in general is unstable due to underground storm water passages and sinkhole collapse. With the large investment in installing any high tech energy harvesting system great care should be taken to have extensive hydrological, geological and environmental assessments. The GWS may have occasional uses for stable deep mines, possibly providing an airflow system or generating useful electricity, if upper and lower portals can be placed at extensive vertical distances.

21. The most effective way to increase production is to use multiple units contributing to the grid as with above ground wind farms. They could also be linked with solar or wind farms to offset each other's down time.

A BRIEF DESCRIPTION OF THE DRAWINGS

22. FIG. 1: Plan View of a Low Mode, near surface Geothermal Wind System.

23. FIG. 2: Profile View of a Low Mode, near surface Geothermal Wind System including optional talus mound tower.

24. FIG. 3: Plan View of the tower/shaft.

25. FIG. 4: Profile View of a High Mode, deep heat, Geothermal Wind System.

26. FIG. 5: Profile View of a High Mode, Geothermal Wind System using natural hot springs.

27. FIG. 6: Plan View of a configuration of wind turbines with Flexible Radial Venturi in an open position.

28. FIG. 7: Plan View of a configuration of wind turbines with Flexible Radial Venturi in constricted position.

29. FIG. 8: Cross-Section detail of grouted Conduction Enhancer for heat exchange passage.

30. FIG. 9: Cross-Section detail of wind velocity enhancing Riblets.

31. FIG. 10: A Cutaway Perspective View showing one possible assembly of double venturi, wind turbines and generating system for a Low Mode Geothermal Wind System.

32. FIG. 11: A Cross-section showing a turbine with constricted venturi.

33. FIG. 12: A Cross-section showing a turbine with open venturi.

34. FIG. 13: A Cutaway Perspective View showing a vertically aligned turbine and power generator configuration with fixed venturi.

Figure 14:
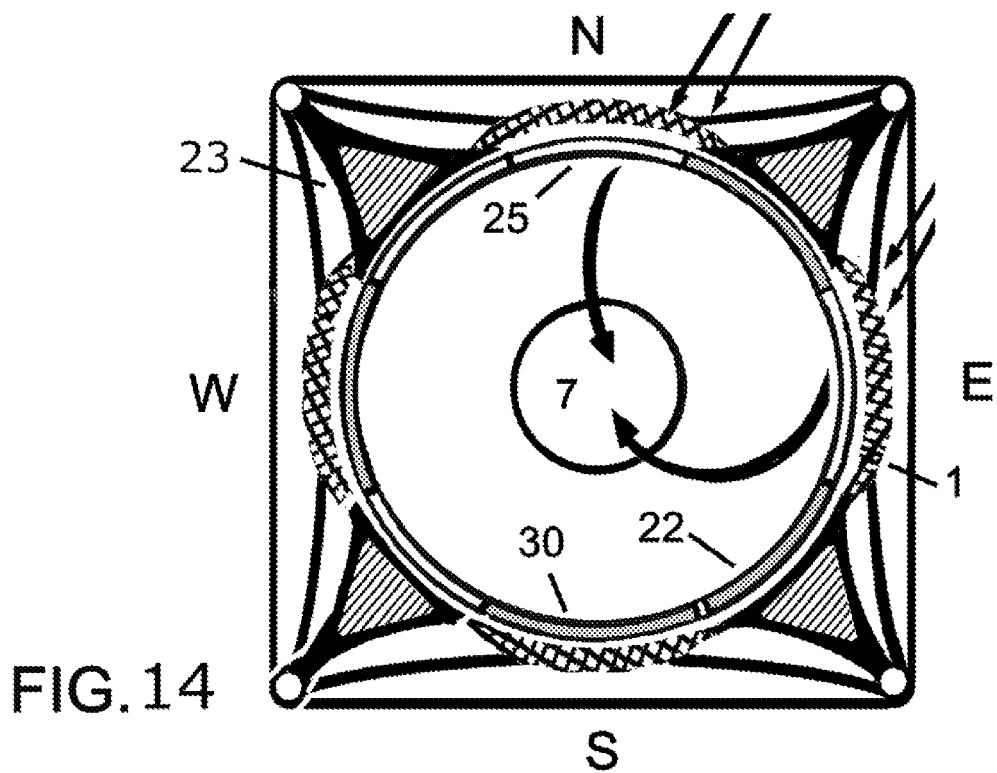

35. FIG. 14: A Plan View of a wind infusing turret.

Figure 15:
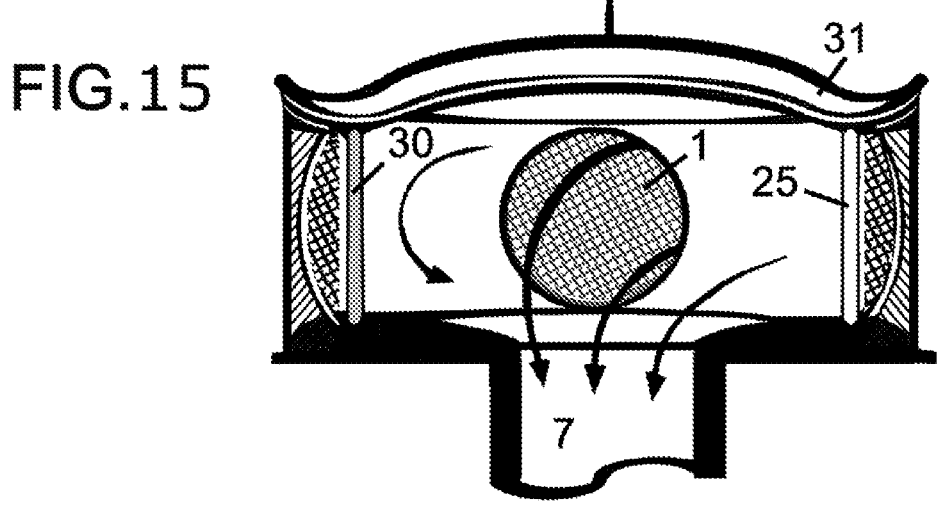

36. FIG. 15: Profile View of a wind infusing turret.

37. FIG. 16: Profile View of a Low Mode Geothermal Wind System including wind infusing/diffusing turrets at opposite ends of the system.

38. FIG. 17: A Plan View of a Geothermal Wind System with multiple shafts converging on a vertically oriented turbine/power generator.

39. FIG. 18: A Cutaway Profile View of a Geothermal Wind System with multiple shafts converging on a turbine and power generator.

Figure 19:
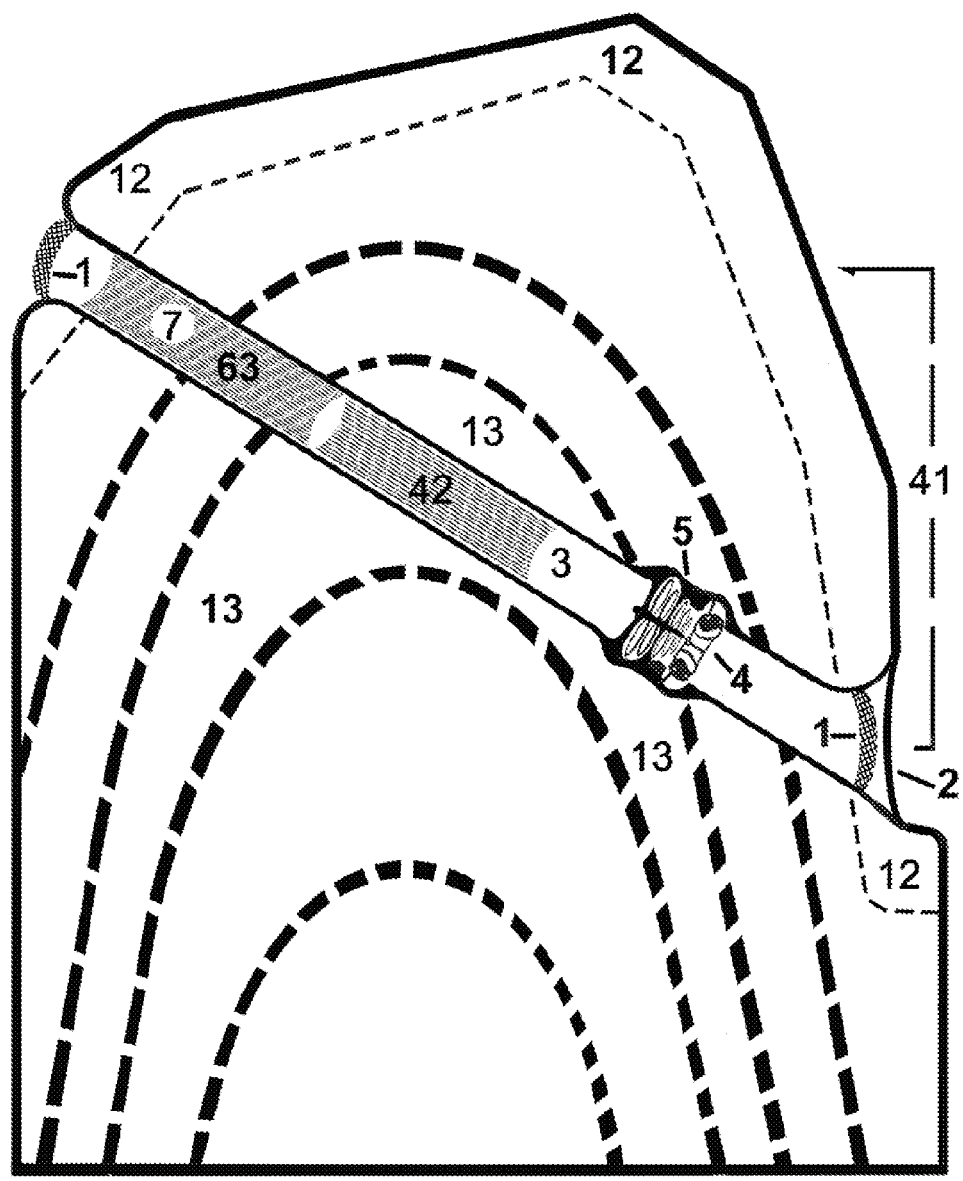

40. FIG. 19: Profile View of a Geothermal Wind System with a diagonally oriented tunnel/shaft.

Figure 20:
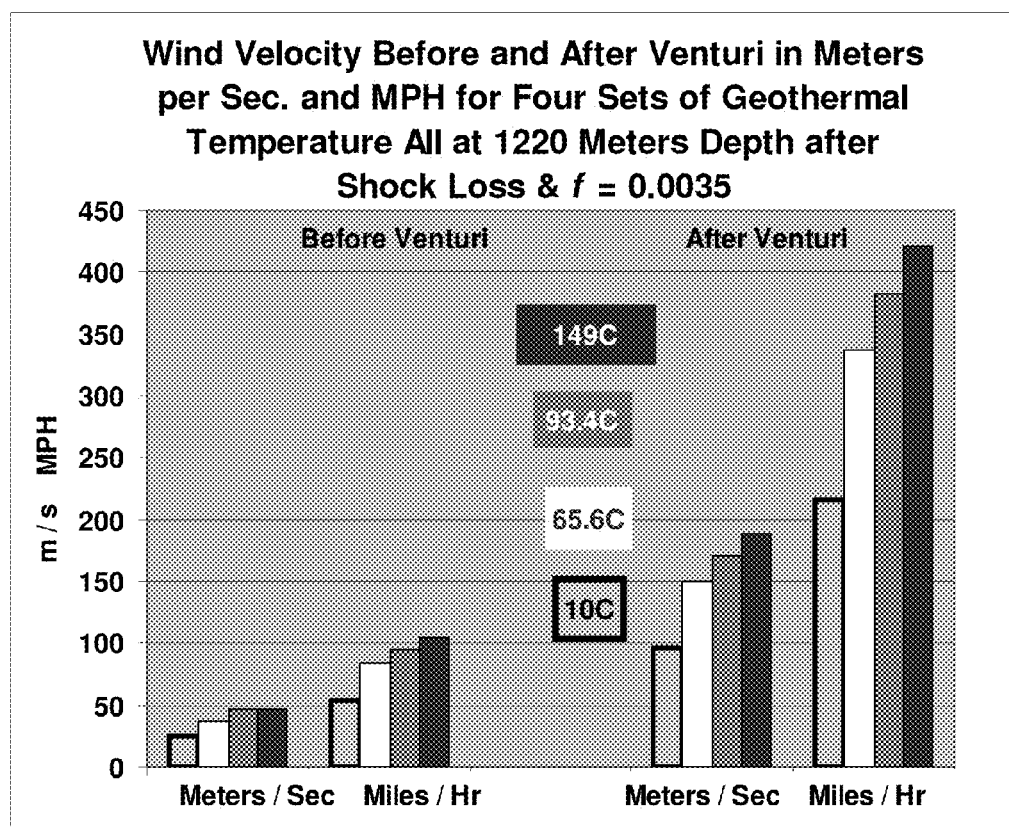

41. FIG. 20: A chart comparing wind velocity with and without venturi.

Figure 21:
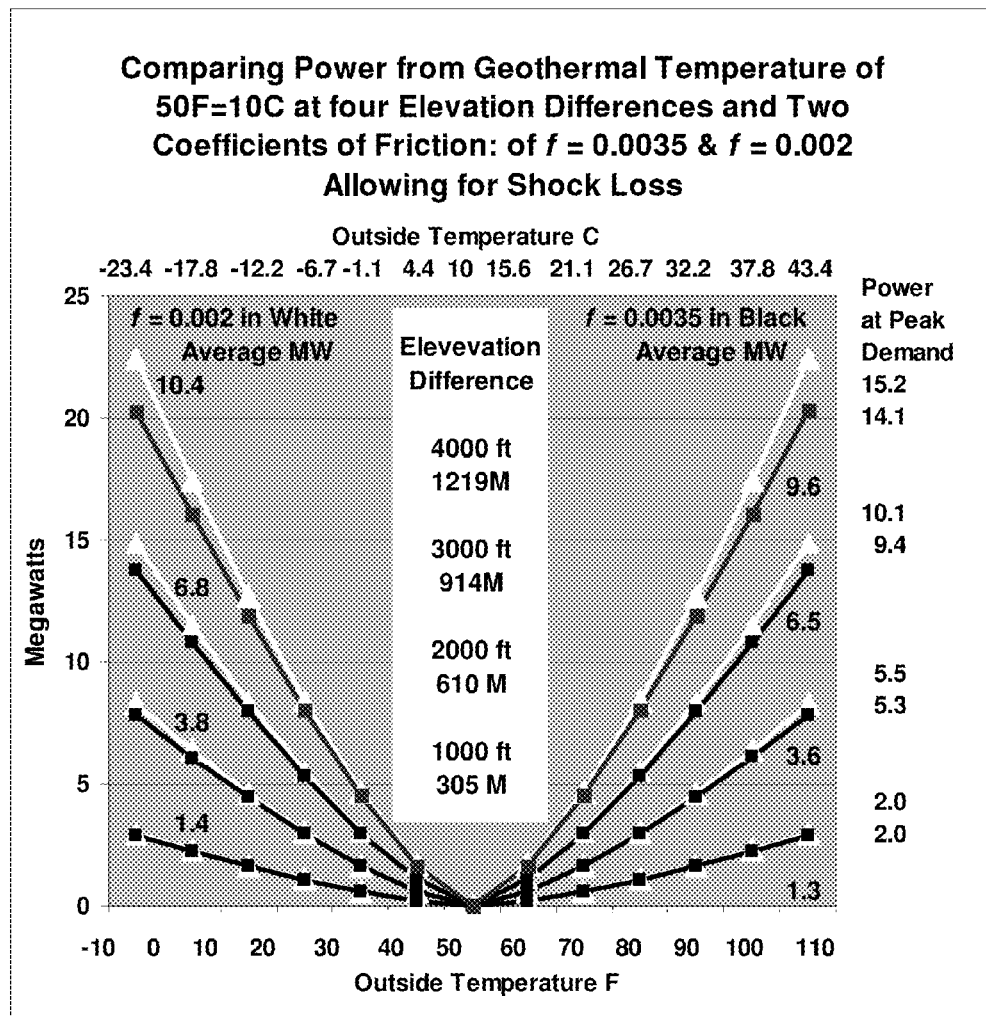

42. FIG. 21: A chart comparing power at four elevation differences and two coefficients of friction at various ambient temperatures.

Figure 22:
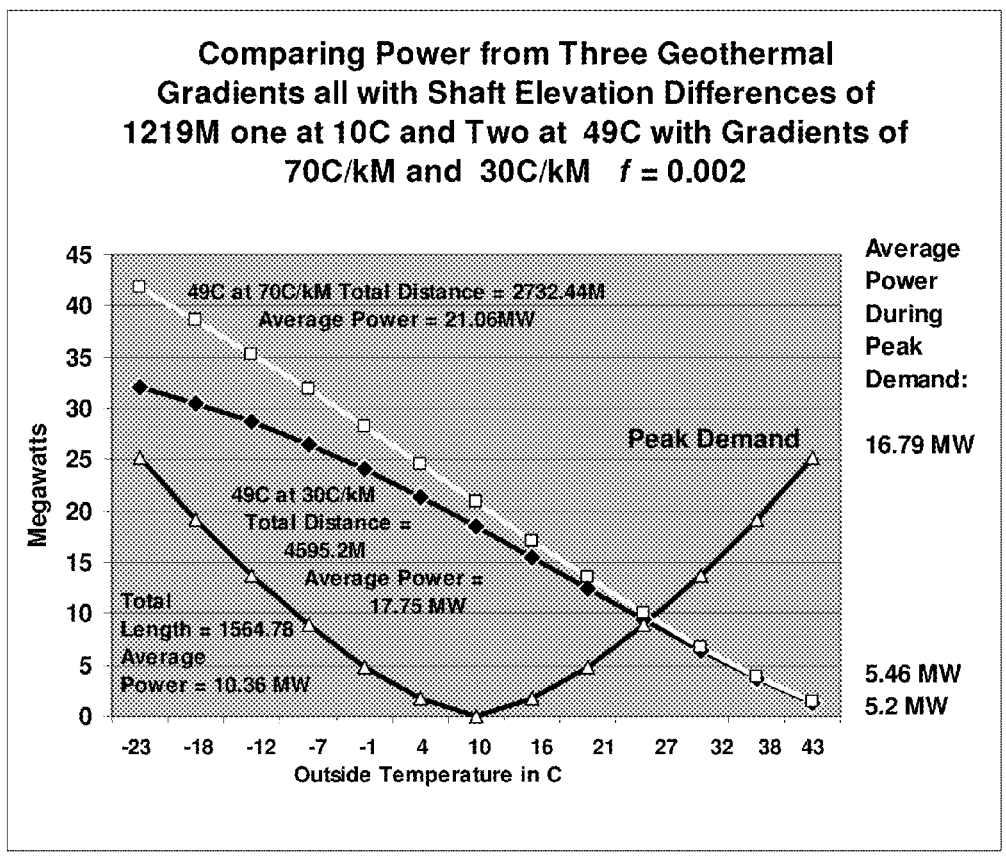

43. FIG. 22: A chart comparing power for two High Modes and one Low Mode of Geothermal Wind Systems at various ambient temperatures.

Figure 23:
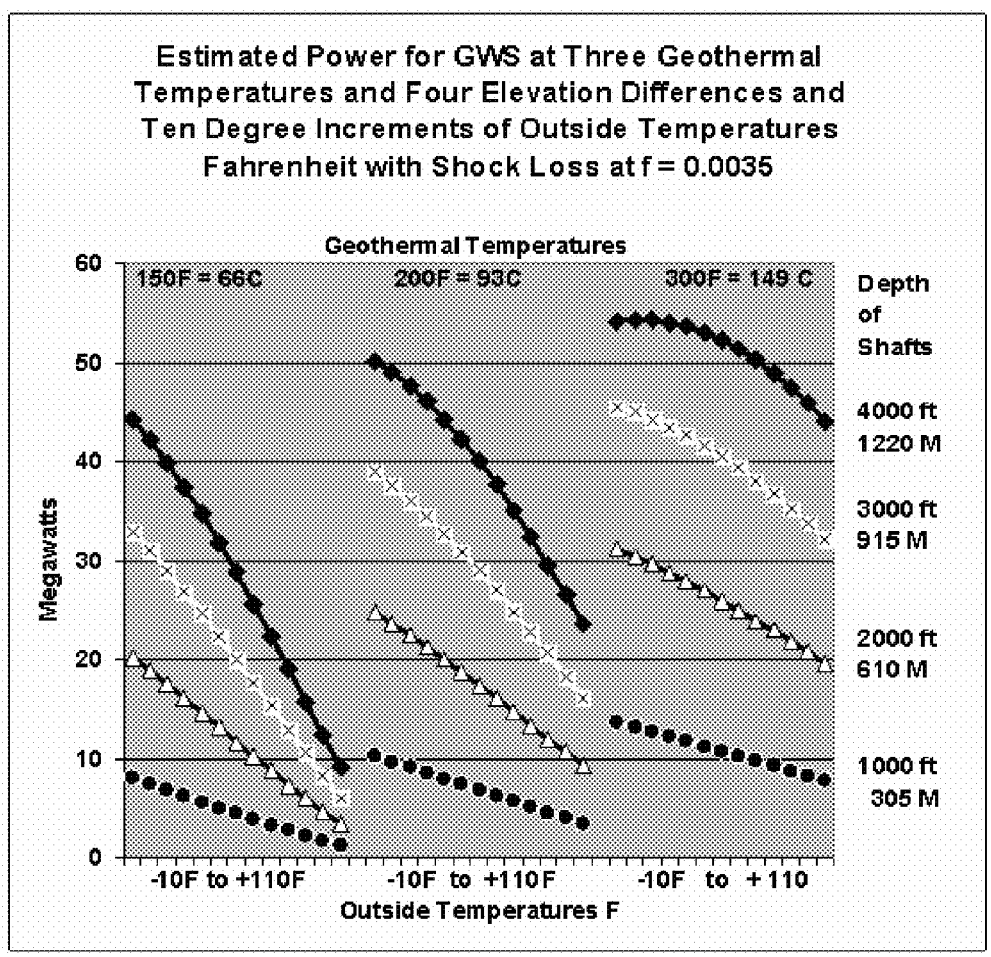

44. FIG. 23: A chart comparing power for three geothermal temperatures and four elevation differences at various ambient temperatures.

Figure 24:
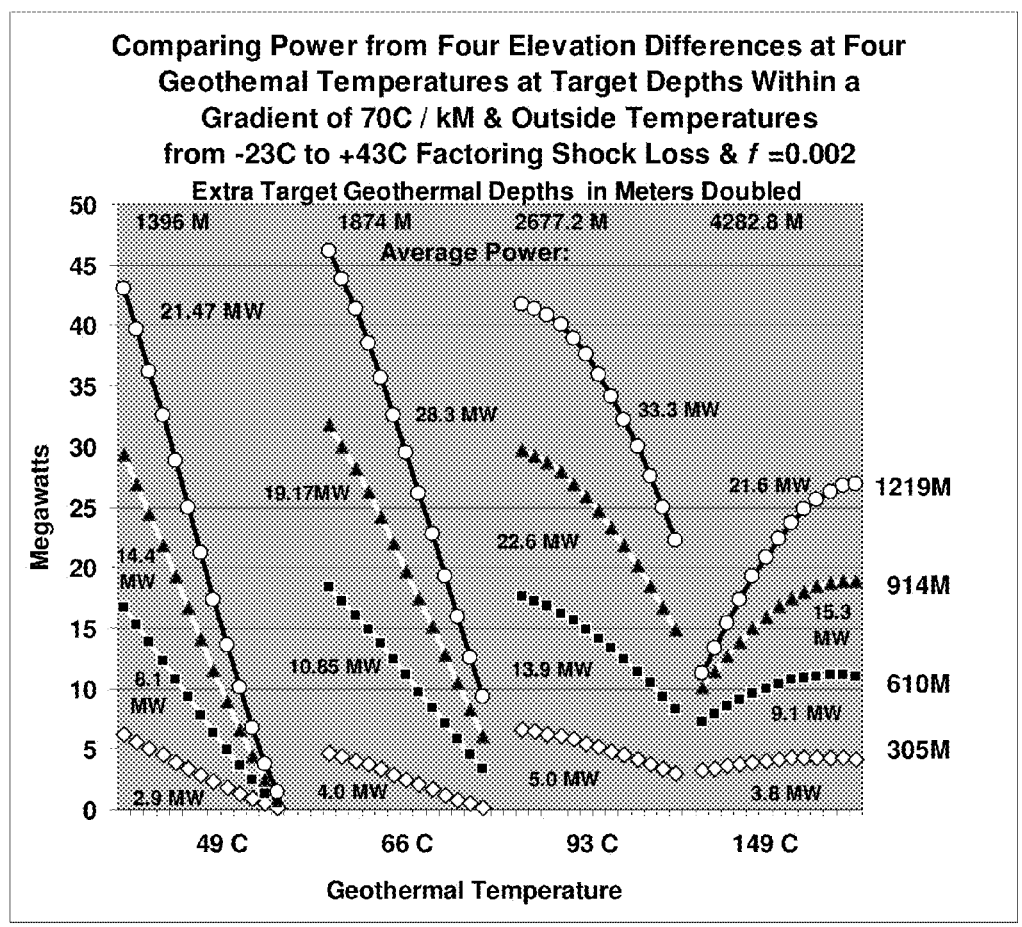

45. FIG. 24: A chart comparing power at four geothermal temperatures and four elevation differences for various ambient temperatures with additional length for target depths factored.

Figure 25:
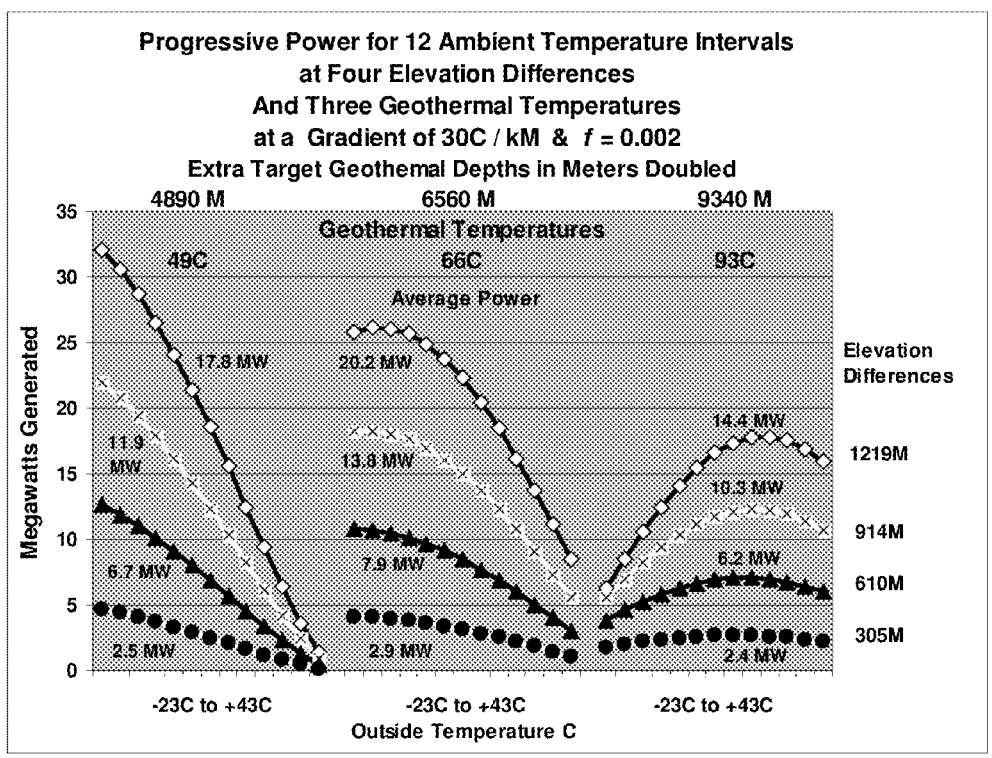

46. FIG. 25: A chart of progressive power for three geothermal temperatures and four elevation differences for twelve ambient temperatures with additional length for target depths factored, showing power decrease at higher ambient temperatures.

Figure 26:
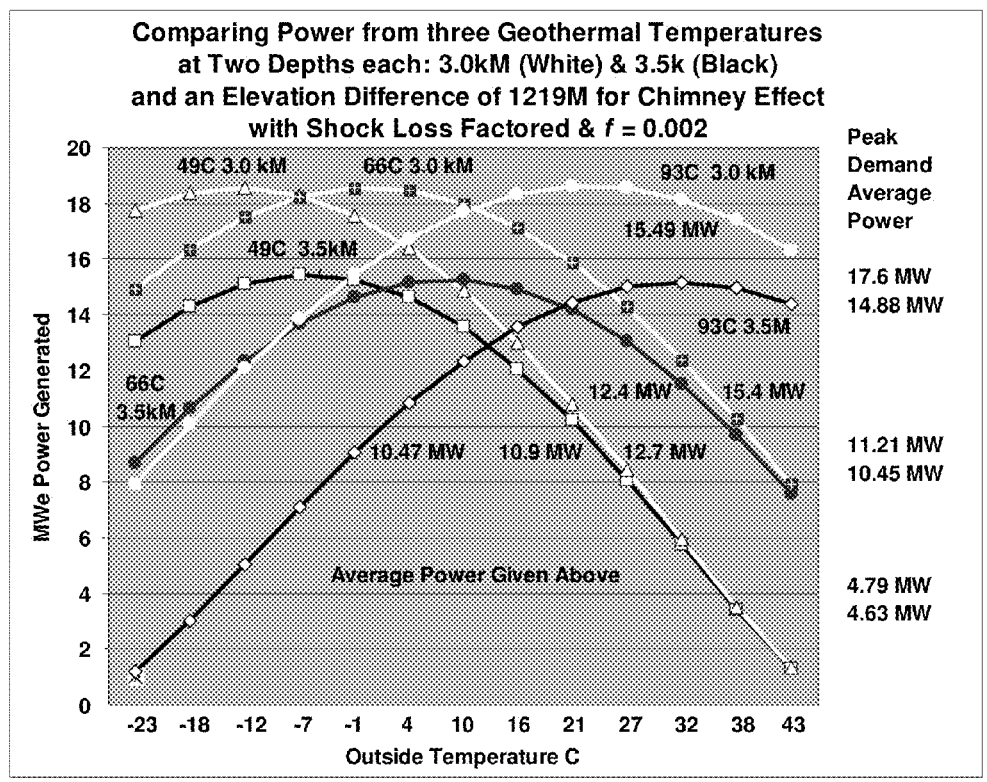

47. FIG. 26: A chart comparing power for three geothermal temperatures and the same elevation differences at various ambient temperatures at target depths each, showing average power at peak demand.

Figure 27:
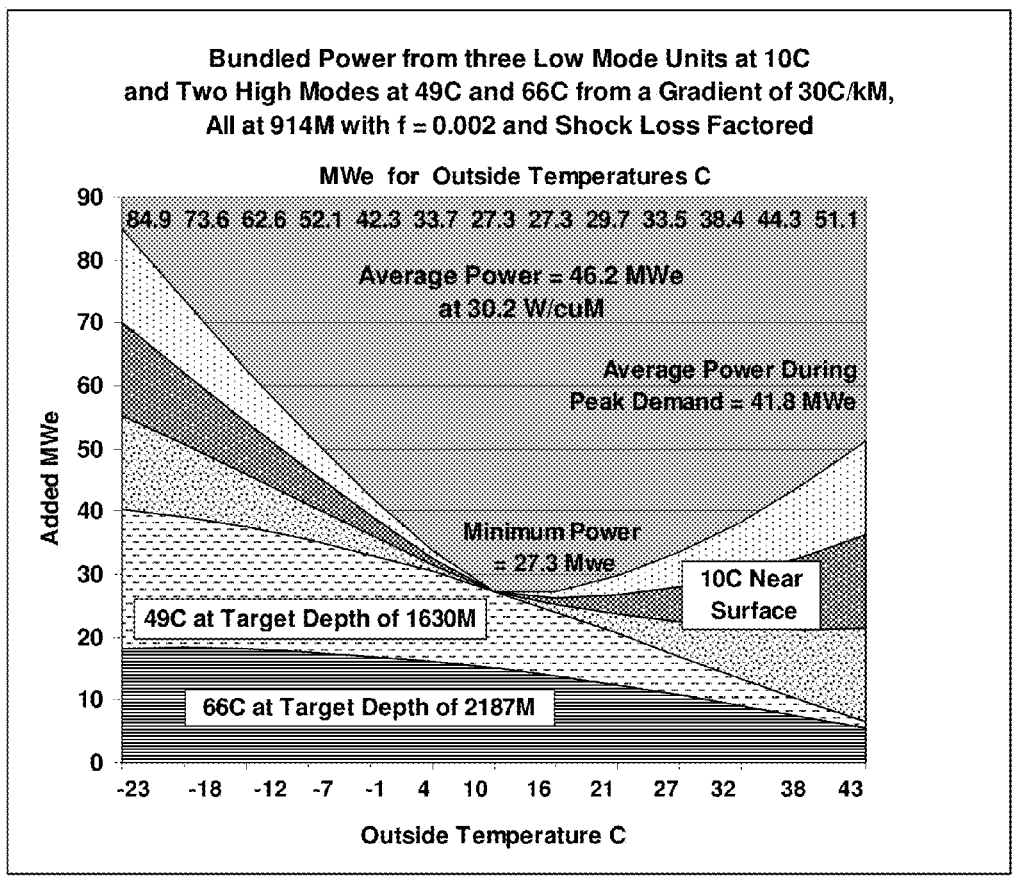

48. FIG. 27: A chart estimating bundled power from three Low Mode Units with two High Mode Units at various ambient temperatures showing average power at peak demand.

Figure 28:
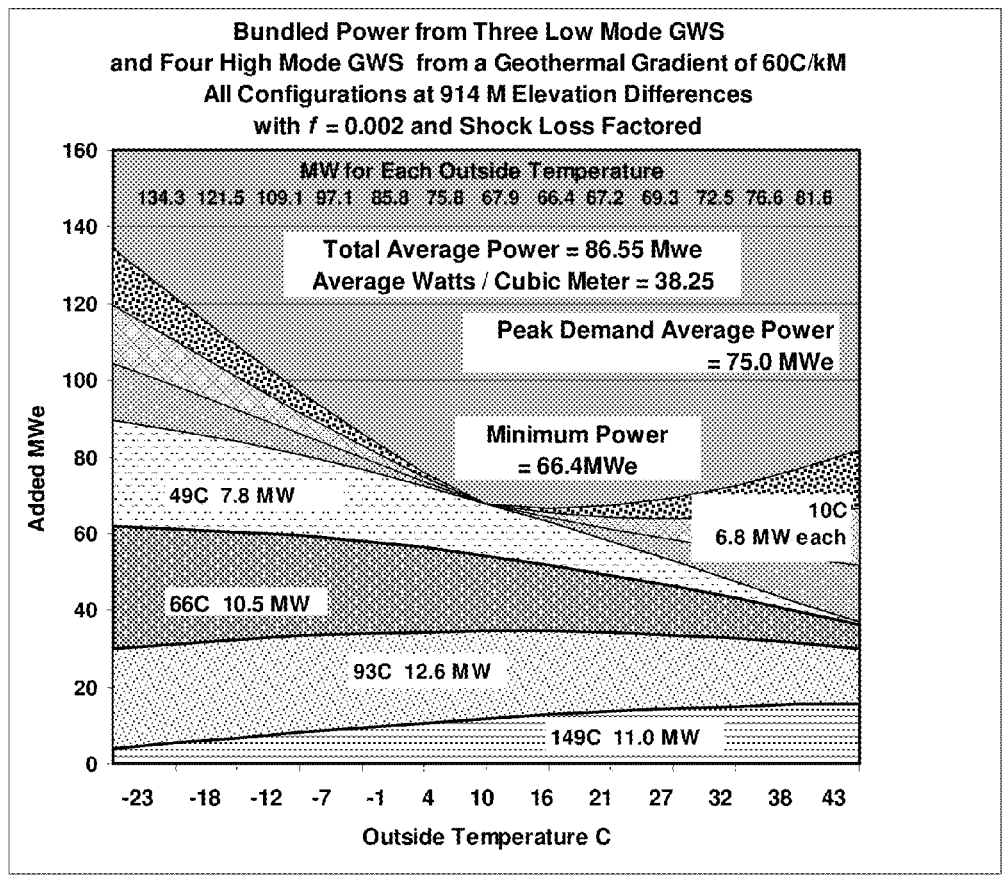

49. FIG. 28: A chart depicting bundled power from three Low Mode Units with four High Mode Units at various ambient temperatures and average power at peak demand.

Figure 29:
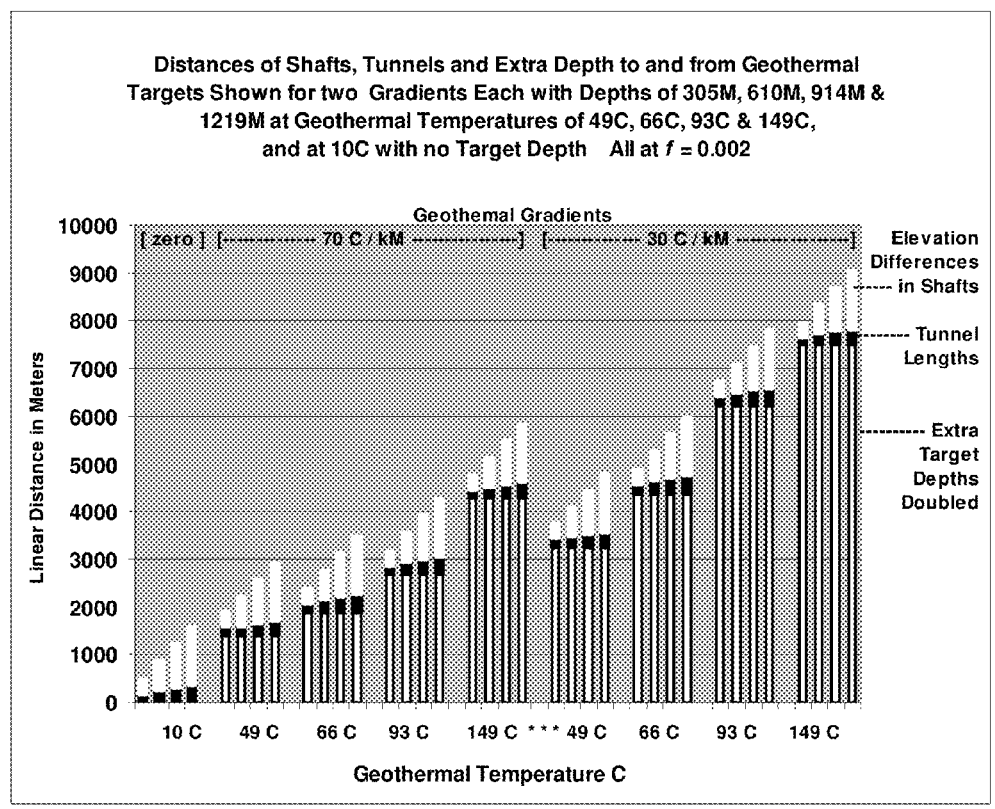

50. FIG. 29: A chart comparing lengths of shafts, heat exchange tunnels and target depths for three geothermal gradients at four geothermal temperatures and four elevation differences.

Figure 30:
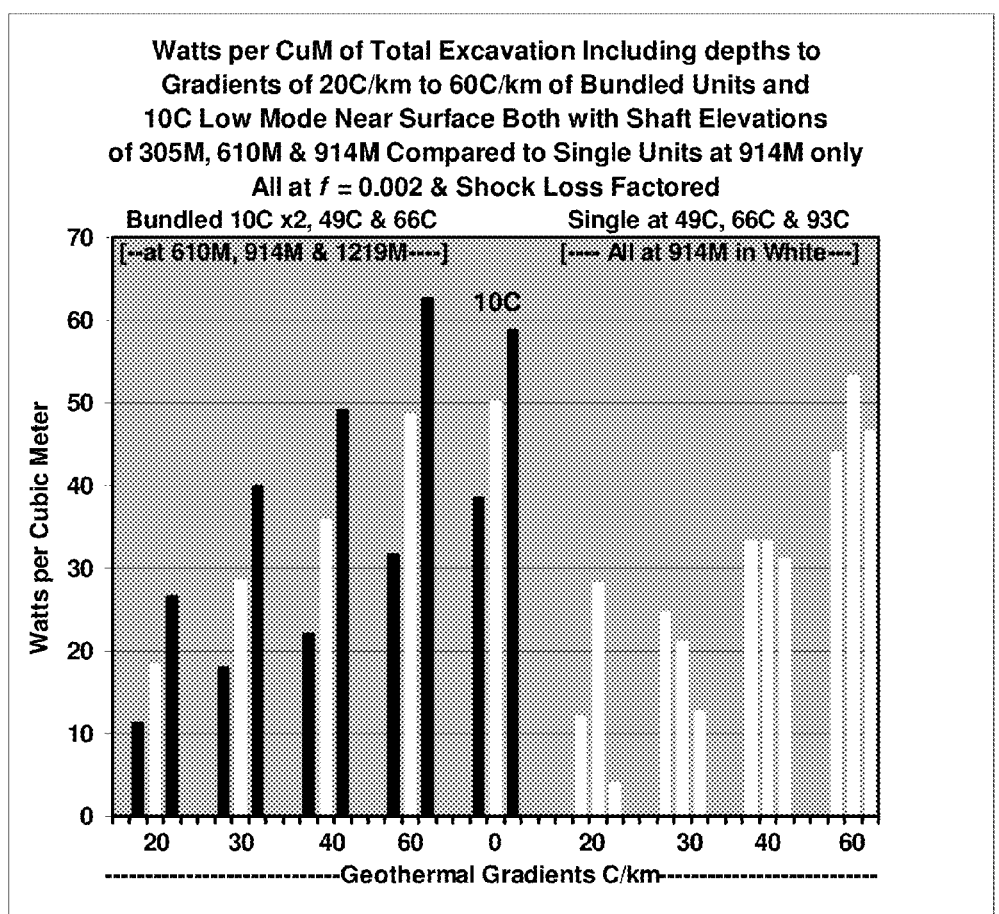

51. FIG. 30: A chart comparing estimated watts per cubic meter of total excavation for various geothermal gradients.

Figure 31:
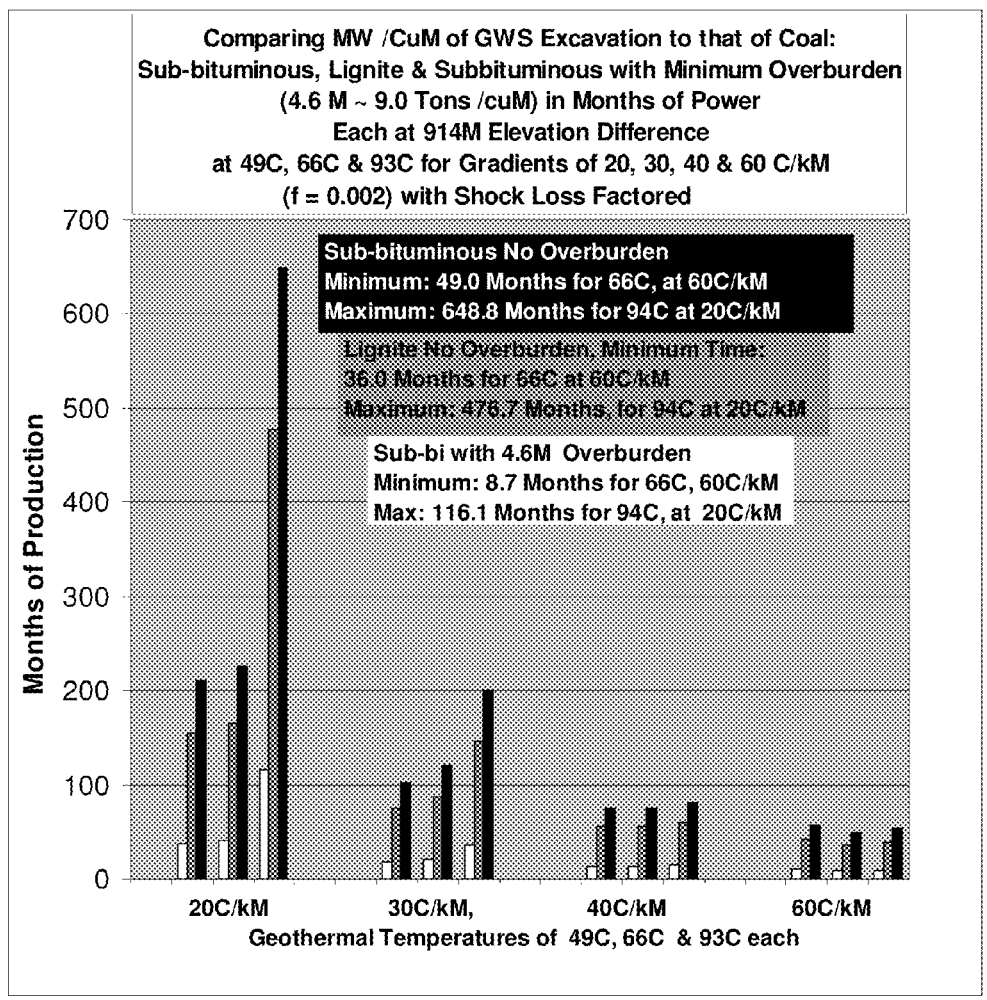

52. FIG. 31: A chart comparing estimated megawatts per cubic meter to that of coal by estimating months of power production of various High Mode Geothermal Wind System configurations to power produced by the same quantities of sub-bituminous and lignite coal.

Figure 32:
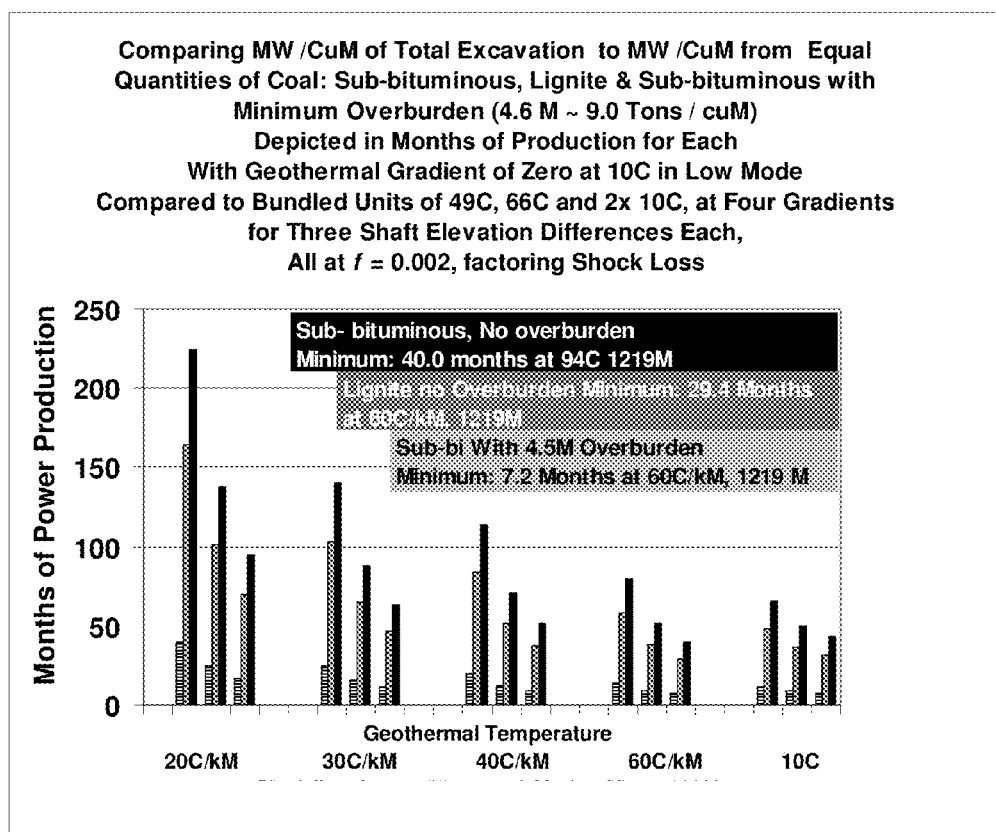

53. FIG. 32: A chart comparing megawatts per cubic meter to that of coal by estimating months of power production of bundled units of both High Mode Geothermal Wind System configurations at four geothermal gradients, and pairs of Low Mode Systems with no extra target depth.

A DETAILED DESCRIPTION OF THE INVENTION (All depictions are representative, not to scale, and may not show the exact field design of the numerous embodiments of the art.)

54. FIG. 1, FIG. 2 and FIG. 3: FIG. 1. Horizontal and FIG. 2. Vertical Schematics of Low Geothermal Temperature Mode GWS: On days cooler than the geothermal temperature, air is pulled into the lower portal (2) by warmer lighter air rising to the upper portal. It first passes through a Fauna Protection Grate (1) built for the purpose of preventing entry by animals or wind blown debris, affixed to a Funnel Shaped Portal (2) which is an infuser/diffuser to prevent excessive suction of objects into the Portal and to make up for wind resistance caused by the Fauna Protection Grate.

55. The air travels 60 meters (200 ft) to temperature stasis beyond the influence of outside temperatures (12). There, a natural temperature exchange takes place between the surface of the tunnel and the air in the Heat Exchange Tunnel (3). This tunnel should be smooth and free of obstructions and circular in cross-section. After a sufficient distance for heat exchange, the moving air is constricted within an Adjustable Radial Venturi set to focus the air for the maximum speed needed to turn the turbines (5), in this case, two pairs of twin Contra-rotating turbines freely and independently turning on a fixed axel held by an aerodynamic cross-beam affixed to the tunnel wall or other housing. All freely rotating turbines can contain permanent magnets to act as a brushless rotor to stator coils mounted on the fixed axel or blade tips containing magnets to rotate along circumference coil affixed to the wall of the tunnel. The turbines should be located centrally between the two portals since the wind can blow in either direction.

56. A set of turbines is placed for each direction of the bi-directional wind cycle which may take hours or weeks. Wind passes through the constricted venturi, accelerating and meets the first set of turbines which actively cause the generation of electricity. The wind then passes the second set of turbines and a second Adjustable Radial Venturi which is open. From there the air rises through the cylindrical Shaft (7) which in this embodiment is lengthened above the ground surface as a stack or tower insulated by a Talus Mound (9) of spoils excavated from the shaft and tunnel. The air finally exits the system through a Cowl (8) with large grated portals to diffuse or infuse air. A separate drawing (FIG. 3) shows the Cowl from above.

57. During warmer weather, the reverse takes place with a heat exchange from the air into the surface of the tunnel causing this denser air to fall through the shaft pulling warmer air into the upper portal to be cooled. In either case the more extreme the temperature is, the swifter the wind. The difference in elevation between portals shown as (41) which along with the diameter of the tunnel are the non-variable factors that most affect the power generation.

58. FIG. 4: Vertical Schematic of High Geothermal Temperature Mode GWS. In this embodiment The Portal Funnel (2) is near the bottom of a cliff face and should have an adequate overhang to protect it from rock fall and have a downward slope to allow water to run away from the tunnel. The Fauna Protection Grate (1) is affixed below the overhang. The wind is induced continuously through this Portal which slopes downward past the boundary of exterior heat fluctuation or Outside Temperature Limits (12). The air increases in warmth with depth but reaches the Adjustable Radial Venturi (4) and one or more turbines (5) before the geothermal temperature is excessive. In this embodiment the turbines (no specific array of blades) are arranged from smallest to largest so the venturi can open wider during higher winds and focus on the smallest during lesser winds. (An expanded view of open and restricted venturi valves is shown on FIGS. 6 and 7). Lesser winds occur when the outside temperature is hottest, approaching the inside temperature. In the Heat Exchange Tunnel (3) beyond the turbines at the highest temperature gradient, an optional Corrugated Conduction Enhancer may be installed (42) to create a larger surface area. This surface may consist of metal sheets similar to corrugated roofing but with smaller corrugations and may be bolted into the rock along the entire surface or just the lower half of the tunnel. The corrugations are longitudinal to mitigate turbulence and should have a coefficient of friction not exceeding 0.003. In this embodiment after passing through the targeted geothermal gradient of sufficient length to conduct the maximum heat, the air rises through a vertical shaft (7). The shaft may also be striated with a different kind of grooves called Riblets (63) (a number of patents previously depict riblets in various forms noted above. Patented riblets may be 0.15 mm or less in depth and in one embodiment with triangular cross sections creating peaked ridges that have been tested for use on aircraft and tunnels reducing drag 3% to 8% despite doubling the surface area. Other refinements in shape have reportedly reduced drag by twelve percent.) Since there is little difference between corrugated heat enhancers and riblets, they can both be considered be enhancements to the GWS but not novel to the invention.

59. As the air nears the opening it passes through an insulated portion of the shaft (44) installed there to prevent the cooler wall from reversing the exchange of heat away from the airflow near the surface of the tunnel. (This insulation may or may not be necessary depending on the geothermal gradient, and the distance above the geothermal target to the surface and the conductivity of the rock.) The air rises and is dispersed through a diffuser cowl (8) with a Fauna Protection Grate (1). Arrows indicate wind Direction. The elevation difference between portals is shown as item (41).

60. FIG. 5 is similar to the previous embodiment except the drawing illustrates the use of the heat exchanger passing through geothermal waters beyond and below the turbines. The advantage would be a more near surface access to higher geothermal temperatures through the natural flow of an upward moving spring. The challenges would be in boring through the hot waters and sealing the tunnel in a metal casing without impeding the flow of the geothermal waters while not allowing leakage into the airflow. If the tunnel could be over-excavated around the spring level and lining partially put in place, while the water is pumped, rounded stones (70) could be pumped around the metal lining to allow the geothermal water to circulate. In addition it may be necessary to coat the outside of the metal casing in epoxy or other material to prevent corrosion by the acid or mineral content of water.

61. FIG. 6 and FIG. 7 depict horizontal cross sections showing a single Adjustable Radial Venturi (4) used to regulate the air flow. Only one is needed since the airflow is unidirectional. FIG. 6 shows the venturi open to slow the air velocity allowing larger turbines (5) to become active. When the venturi is restricted, as in FIG. 7, the wind speed is greatly increased and focused on the smaller turbines. The turbines rotate on an axle set between duel cross-arms (6) which may be contained inside a smoothly shaped metallic form that could be pre-cast in sections, welded on site and attached to the walls of the tunnel to assure the best possible aerodynamics. This depiction does not represent a final turbine design. Note, the turbine/generators are set upwind from the targeted geothermal gradient to prevent damage from heat. Arrows indicate wind direction. Also shown is section of corrugated or otherwise longitudinally grooved surface which can enhance the efficiency of the heat exchange, FIG. 8 shows a close up cross-section of a segment of the material. By increasing the surface area by about three times in the heat exchange tunnel without increasing the radius to be heated significantly the length of the heat exchange can decreased by the same amount. Corrugated sheeting may be pressed into wet grout (46) on the floor of the passage and bolted into the sides without grout as needed. It can be retro-fitted if wind speed estimations are revised due to empirical data. An alternative to the curved grooves are Riblets (63). Shown in magnified cross-section, FIG. 9, similar to the corrugated surface, this airway surface is composed of longitudinal striations but with a cross-section consisting of equilateral triangles. As mentioned previously these options are considered valuable enhancements to the present novel invention but not necessary or novel to it.

62. FIG. 10 is a Cutaway Perspective View showing a representative assembly of Adjustable Radial Venturi (4) constricted upwind and open downwind, consisting of six or more hinged fingers or petals which can swing inward toward the central axis of the tunnel. When open, they are recessed in nooks to be pushed outward by pneumatic, hydraulic or electromechanical devices not shown. When the wind reverses, leeward petals retract like aircraft landing gear. The petals should be rubberized or otherwise compressible on the exterior with a solid substructure attached to the pushing mechanism. The outer material would be flexible enough so they can lock together to focus the air. When constricted, they should present a curved radius for the airflow such as to offer the least air resistance. Arrows indicate wind Direction.

63. Also depicted is a representational configuration of two sets of twin Contra Rotational Turbines (5) shown suspended from a cantilevered rigid axle (16) held by a vertical Aerodynamic Brace (6) which is elliptical in cross-section designed for minimum wind resistance. This double set of turbines is conceived to accommodate bi-directional winds and by contra-rotating, the leeward blades take advantage of turbulence in the wake of the windward blades. The contra rotating blades are shown farther apart than what might be considered the most efficient distance, in order to avoid confusion in the illustration. This assemblage could be contained within a shaped form, delivered in sections and welded in place, where cross arms and turbines could be attached. Note: the nose cones (40) should become in effect part of the venturi restriction by decreasing the volume of airflow while spraying the air in the direction of the turbines.

64. Further shown in this embodiment is a strategy for using the turbine itself as the rotor of a generator/alternator brushless permanent magnet system. Placing the permanent magnets near the axis ring (17) of the turbine, and the coils (15) on the fixed axle adjacent to the rotor the wiring leads (18) would be fed through the fixed axle and out through the cross-brace. This assemblage is designed to eliminate mechanical inefficiencies, and to let each of the turbines turn freely so as to generate duel currents for separate purposes or act in unison. These electrical and turbine strategies are not unique or necessary to this invention and should be viewed as one possible arrangement of accessories to illustrate a workable depiction of the GWS. Previous patents represented here will be discussed below.

65. FIG. 11 and FIG. 12 are axial cross-sections showing the Adjustable Radial Venturi (4) in a constricted position. FIG. 11 viewed looking windward, and in open position, FIG. 12 also showing the relative position of the turbines and the crossbeams, viewed looking upwind. For maximum air flow, the windward venturi is constricted while the leeward venturi is open.

66. FIG. 13 is a Cutaway Perspective showing a vertically oriented set of twin contra-rotating turbines (5) with a ring of magnets (20) attached to the blade tips acting as a rotor adjacent to a stationary ring of coils (14) to create a brushless generator. Each turbine has its own axle, attached to a tri-beam support housing (21) one suspended from below, one mounted above the bearing housing. The two turbines could be mounted on MAG-LEV bearings and act as flywheels during down times. These enhancements are not new to the art and can be found separately in several other works, but are only meant to show that this particular invention (GWS) is suitable for use of these and many more enhancements that will improve the efficiency of the present art. This embodiment shows the assembly contained within a fixed venturi (29).

67. FIG. 14: a Plan View and FIG. 15, a Profile View of a Wind Infusing Turret, used to augment the Low Geothermal Temperature Mode by infusing surface wind into the downward falling air during warm weather, or by allowing ambient exterior wind to flow through the Turret (31) lowering the air pressure to assist rising warm air in cold weather. Four wide infusers and four portals give 360 degree access to wind as shown in plan view which also illustrates the operation of the four Sliding Doors (22). The surface wind is collected through funnel shaped Infusers (23) on four sides of the Turret, that are shielded by convex Fauna Protection Grates (1) at each of the portals. The Portals beyond the Infusers can be opened and closed by Sliding Doors (22) which could be operated electrically. Two of the more leeward portals are shown closed (30) on the south and west sides to infuse the wind downward into the Stack (7). The others are shown open (25) accepting wind out of the northeast. The turret would normally be placed atop a stack and talus mound. Arrows indicate wind Direction.

68. FIG. 16 is a Profile schematic View showing a Low Geothermal heat Mode GWS with two Turrets operating on opposite ends of the system. The upper turret (31) which is built atop a compacted Talus Mound (9) acts as an infuser. The lower turret acts as a diffuser with all four Portals open. In this embodiment the Turrets (31) are simplified without the funnel shaped infusers. The system is set up for warm weather to allow surface wind passing through the Fauna Protection Grate (1) into the windward Portal through the Open Sliding Doors (25) to be infused into the shaft by mounting pressure due to the leeward Closed Sliding Doors (30). This wind pressure increases the downward action of the air inside the Shaft (7) and Heat Exchanger (3) where the air is cooled by the lower geothermal temperature as heat is exchanged into the walls. Also shown are riblets (63) in both shafts to reduce drag allow better efficiency of air flow. This cold air is heavier than the outside air and flows to the lower Turret (31) where All Portal Doors are open to allow surface wind passing through the turret to create lower atmospheric pressure. An opposite arrangement would be configured during cold weather when air inside the system is heated and rises. In that case the upper turret portals would be open allowing surface wind to create lower pressure to facilitate an updraft to the upper portal, while the lower leeward portals would be closed to infuse surface wind. This embodiment would increase power for regions of low geothermal temperature and low elevation, particularly during moderate temperatures. Arrows indicate wind direction. Striations called Riblets are shown by vertical lines in shafts (63).

69. Also shown in this embodiment of the GWS is a Fixed Venturi Constriction (29) which would focus wind on one or more turbines, shown here as twin contra rotating turbines (5). The fixed venturi has a disadvantage of creating more shock loss turbulence since it can't be retracted during a change of winds. Other embodiments of turbines could be designed to fit specific conditions for each location as may be conceived by others more knowledgeable in the art. The elevation difference between portals is shown as item (41).

70. FIG. 17 is a Schematic Plan View of another embodiment of the High Temperature Mode of the GWS, and FIG. 18 is a Profile View of the same. Here a large diameter Shaft (7) that contains a fixed venturi (29) which increases the wind speed and focuses the wind on one or more turbines (5) generating electricity. From there, the air is drawn downward through a plurality of narrower drilled bore holes (11) extending to the Targeted Geothermal Temperature (13) where it is heated and propelled upward by buoyancy in a U-shaped path to exit through Diffuser Vents (8) enclosed by Fauna Protection Grates (1). The elevation difference between portals is shown as item (41). Note: The area of combined out-flowing drill borings should be equal or greater in cross-section than that of the larger down flowing shaft to ensure maximum efficiency (one 12 m diameter boring equals 144 one meter diameter borings or 36 two meter borings which also equals 16 three meter diameter borings). Extra borings may be needed to account for extra air resistance for added surface area. This embodiment may provide a means to reach deeper, hotter thermal gradients without human entry.

71. FIG. 19 shows an embodiment with a diagonal combination of Heat Exchange Tunnel (3) and Shaft (7) passing through a representative mountain of similar geology to that of FIG. 4. This scheme might be particularly useful where tilted bedrock may contain softer strata between harder layers of rock. Air passing through the Fauna Protection Grate (1) and Portal Funnel (2) beyond the Outside Temperature Limits (12), the air is compressed by the Adjustable Venturi (4) where it increases velocity and focused onto one or more Wind Turbines (5) which power Electrical Generators (not shown). Where the Tunnel passes through the Targeted Geothermal Gradient (13) the Corrugated Conduction Enhancer (42) allows a larger surface for the heat exchange. Riblets (63) also shown by longitudinal lines to improve aerodynamic performance by reducing drag. The hot air is then expelled through an upper portal which also features a Fauna Protection Grate. The diagonal schematic allows the most direct distance between the two portals with the least friction.

72. The following graphs were made from calculations using formulas for the stack effect, power from wind turbines and the venturi effect, using the preferred embodiment with cylindrical tunnel and stack diameters of twelve meters, a venturi opening of six meters, and turbine diameters of likewise six meters, using standard dry air density with 44% combined Betz factor and Mechanical efficiency. Despite drawings showing otherwise, calculations were done for power from a single turbine although drag was figured for two. Note: average megawatts are calculated at equal intervals of ten degrees F. between minus 10 F and plus 110 F. The geothermal temperature used for Low Mode GWS was 50 F (10 C) for those graphs. Elevation Difference, also called Depth of Shaft is the vertical distance between upper and lower portals and may include a tower added to extend the chimney effect but does not include depths below the lower portal to reach geothermal target gradients. Calculations were made for Elevation Differences from 1000 feet to 4000 feet in thousand foot intervals (305 M to 1219 M). These specifications were made for simplicity when comparing numerous calculations using spread sheets. Other better results may be found empirically by experimenting with other venturi sizes and distances between the venturi choke and turbines. Average megawatts for the same outside temperature intervals using 60 F (for warmer climates) as the Low Mode geothermal temperature showed a difference of plus 0.02 to 0.03 megawatts.

73. Calculations assume dry bulb temperatures with a coefficient of friction inside the tunnels between and 0.005 and 0.002 as shown. The coefficient of friction of 0.0035 which was suggested from wall roughness reported from field notes for a smooth bored vertical shaft (Equivalent roughness for pressure drop calculations in mine ventilation, C. Montecinos & K. Wallace, Jr. 2010) and from the McPherson table showing friction for spiral steel air ducts. A coefficient of friction of 0.002 is more widely used. This low friction may require modifying the surface with tubular sheeting with riblets other materials as previously mentioned and discussed below. The lower friction was found to be necessary when adding extra depth to the target gradient, which increases resistance without increasing buoyancy, since this extra length must be doubled to bring the air back up to the level of the lowest portal.

74. Shock loss For Low mode GWS was calculated for two turbines, each with a double vane averaging a 0.1 meter wind facing surface width with a total length of 6 meters. Also included was an aerodynamic vertical support of a tenth of a meter wind face width. The wind vanes and vertical support were given a coefficient of drag value of 1.06. A shock loss value for the entry and exit of the Venturi was also factored. Finally, the Shock Loss for one 90 degree bend which has a radius of curvature equal to the diameter of the passage (12 meters) is given at 0.2. For all High Mode GWS calculations, head-loss and shock loss values for one six meter diameter double blade turbine and one 12 meter diameter turbine, three 90 degree bends and the venturi restriction have been included. All these shock and drag values can be found in Subsurface Ventilation Engineering: McPherson, 1993 (chapter five).

75. Greater humidity and higher altitudes may cause slightly reduced results. For air from 20 F & 90 F (−7 C & 32 C) the difference in density between dry air and saturated air increases from 0.4% to 5.1%. If the lower portal is placed at 1000 meters (3280 ft) above sea level the density of air would be about 90% of that at sea level. At an altitude of 2000 meters (6560 ft) the density would approach 80% of sea level, but this is for the lower portal. An upper portal at a higher altitude may decrease the efficiency during cold weather during the downdraft cycle of a bidirectional Low Mode, but these percentages are expected to be mitigated by the much colder temperatures at those altitudes. Moisture while increasing density will also increase temperature due to absorption of radiant heat from tunnel surface.

76. FIG. 20: Wind Velocity with and without a Venturi Restriction. A Graph comparing average wind speeds for a GWS with and without a six meter diameter venturi constriction in a 12 meter diameter tunnel system and an elevation difference of 4000 feet (1220 meters) at varying geothermal temperatures using a coefficient of friction at 0.0035. Shock Loss (as above) was factored. Increased friction due to extra length of a target depth to a geothermal temperature was not included. The Figure shows wind speed in meters per second and in miles per hour increasing four times as much using a venturi with half the diameter of the tunnel and shaft. For 200 F (93 C) geothermal gradient, the wind velocity produced increases from 32.4 meters per second in the tunnel to 129.7 meters per second at the venturi, the equivalent of 72.6 to 290.5 mph.

77. FIG. 21: Comparing Power for a Geothermal Temperature of 50 F (10 C) at Four Elevation Differences and two Coefficients of Friction: f=0.0035 and f=0.002, Including Shock Loss. The Low Mode GWS shuts down as the outside temperature reaches that of the inside, increasing in power as the outside temperature either gets colder or warmer than the inside. Increased elevation differences between the upper and lower portals (depths) also greatly increase power, although at a cost of more friction for each extra meter, but calculations show that the extra buoyancy tends to overcome the loss of power due to resistance. The Low Mode GWS also has a much lower percentage of friction than higher modes but still has a lower output than those with higher geothermal temperature input. Shown in separate lines, black for f=0.0035 and white for f=0.002, at 1000 ft (305 M) the graphs depict less than a tenth of a MW difference between the two frictions, but at a four thousand feet (1219 M) shows 9.6 for the average megawatts from f=0.0035 and 10.4 MW at f=0.002. The peak Demand Average at outer temperatures between 80 F and 110 F (27 C and 43 C) at that elevation Difference is 14.1 MW and 15.2 MW. Peak demand power for each elevation difference is about 47% higher than average overall power. Since this mode is no deeper than the chimney depth, no extra friction is added to a target geothermal depth.

78. FIG. 22: Comparing Power from Three Gradients, All with Shaft Elevation Differences of 1219 Meters, one at 10 C, Two at 49 C with gradients of 70 C/km and 30 C/km and f=0.002. Calculations at ten degree increments for outside temperatures from −10 F to +110 F (−23 C to 43.4 C) create a hyperbolic arc for 4000 feet (1219 M) depth at a 50 F (10 C) geothermal temperature with the greatest power at 25.26 MW on both ends of the temperature scale, shown in black. The graph for 49 C at 70 C/kM in white describes a straight line dipping from the coldest outside temperature (−10 F, −23 C) at 41.8 MW to the hottest temperature 110 F (43.4 C) with 1.4 MW. This graph shows that during peak demand above 80 F, power produced by the Low Mode 50 F (10 C) degree GWS with a 1219 M vertical difference exceeds the power produced by both units with a 49 C geothermal temperatures. A curved line in black arcs downward form 23.5 MW below the white line but crosses the white one to generate 8.3 MW at the highest outside temperature. This graph depicts the difference made by the geothermal gradient which determines the extra depth to target temperature. At 70 C/km (a localized gradient found in a few western states) the depth to reach 49 C (120 F) would be an extra 700 meters but at 30 C/km (a more widespread gradient) the extra depth would be an extra 1650 meters, worse still, these distances would be doubled to include the down draft and updraft bore holes plus the length of the heat exchange and the elevation difference between upper and lower portals. Comparing average power and total boring length, at 10 C with no extra depth the total length is 1564.78 meters (elevation difference plus heat exchange tunnel) generating 11.35 MW, but for 49 C at 70 C/km the total length is 2732.44 M with 21.06 average megawatts, and for 49 C at 30 C/km requiring 4594 meters the average power is 17.75 MW. Extra length required for the lower gradient (30 C/km) causes power loss due to more friction and turbulence but the two lines for these gradients at 49 C drop steeply and converge as outside temperature rises close to the internal temperatures and wind speed slackens. The Low Mode 10 C is also depicted with more than three times higher average power during peak demand than either of the higher geothermal temperature (49 C) graphs.

79. FIG. 23: Estimated Power for High Mode GWS for Three Geothermal Temperatures at Four Depths and Ten Degree Increments of outside Temperature Fahrenheit Factoring Shock Loss and a Coefficient of Friction of 0.0035. Showing three high geothermal temperatures (150 F=66 C, 200 F=93 C and 300 F=149 C) without factoring depth to the geothermal gradient. Even with a slightly higher coefficient of friction of 0.0035 nearly straight trajectories are depicted. Deflections in the lines indicate loss of power during coldest external temperatures, where the highest wind velocities are disrupted by turbulence. These scenarios represent possibilities where high geothermal heat is found near the surface as with hot springs, saving the power inhibiting friction of extra deep passages.

80. FIG. 24: Comparing Power from Four Elevation Differences at Four Geothermal Temperatures at Target Depths within a Gradient of 70 C/kM with Outside temperatures from −23 C and +43 C Factoring Shock Loss and f=0.002. This figure includes an additional geothermal temperature, 49 C not shown on the previous sheet. At the proposed Gradient of 70 C/kM the distances to target depths are relatively low, and using a lower coefficient of friction than the previous sheet the trajectories of the two lowest geothermal temperatures appear straight with the trajectory of the 66 C temperature producing only slightly less than on the previous FIG. 23, while the two highest geothermal temperatures show more deflection than FIG. 23. The trajectory for the 149 C geothermal temperature stalls out drastically during coldest temperatures and highest elevation differences where the wind velocity crosses the threshold of very high turbulence leaving only power generation at the highest outside temperatures with slower wind velocity. Note also that the lowest geothermal Temperature (49 C) is shown producing more average power than the highest (149 C) with three times the geothermal temperature. This high geothermal gradient is also rare in the Continental United States outside of Wyoming, Idaho, Oregon, Nevada and California.

81. FIG. 25: Progressive Power for Twelve Ambient Temperature Intervals at Four Elevation Differences at 1219 M and Three Geothermal Temperatures all at 30 C/km with Coefficient of Friction of 0.002. This figure is similar to the last except the highest geothermal temperature (149 C) is missing since that strategy would be almost totally overcome by turbulence, calculations showing an average power of 0.022 MW. The 149 C (300 F) temperature at a 30 C/km gradient would be found at a depth near 5 km which would have to be doubled and added to the length of the chimney/shaft elevation difference. The highest Geothermal temperature shown is 93 C (200 F), which at the gradient of 30 C/km could be found at 3114 M depth. That same gradient will produce 66 C (150 F) at 2187 M and 49 C (120 F) at 1630 M. The graphs on this figure look similar to the previous although with less power. Only the 49 C geothermal trajectory is nearly straight. The other lines show drastic fall-off during lowest ambient temperatures when turbulence is greatest. These calculations included heat exchange to the air during flow to the target gradient so that at 30 C/1000 M=3 C/100 M the final heat exchange tunnel need only be about six meters under ideal conditions. Also included however, was extra length necessary to transfer the coldest temperature to the first near surface static temperature of 10 C.

82. FIG. 26: Comparing Power for Three Geothermal Temperatures at Two Geothermal depths, 3000 M (White) and 3500 M (Black) and Elevation Difference of 1219 M for Chimney Effect, Factoring Shock Loss and f=0.002. These particular depths were chosen because geothermal temperatures (mapped by Southern Methodist University) from 75 C (167 F) or less can be found widespread across the United States at 3000 M depth and at 3500 M temperatures are widespread up to 100 C (212 F). At 3000 M a gradient of 16.7 C/km would yield 49 C, and a gradient of 22 C/km would yield 66 C. At 3500 Meters a gradient of 26.8 C/km would yield 93 C, a gradient of 18.8 C/km yields 66 C and a gradient of only 14 C/km yields 49 C. As in FIG. 25, trajectories of power are shown in increments from −23 C to +43 C. The pattern shows the highest and lowest geothermal temperatures with almost mirror image trajectories, although the 94 C showing slightly more power than the 49 C. The two lines representing 49 C at 3000 M and 3500 M Target Depths arc upward from the coldest outside temperature but drop from about −7 C descending steadily to merge at 4.6 and 4.8 MW at the highest outside temperature. For this low geothermal temperature, most of the power is coming from the elevation difference for the chimney effect. The lines representing the power for 93 C (200 F) begin with low power at low temperatures, climbing steadily to arc slightly at peak demand, the average peak demand predicted for 3000 M Target Depth at 15.5 MW and for 3500 M at 10.47 MW. This opposite trajectory from the 49 C path shows that due to excessive turbulence during cooler ambient temperatures most of the power is generated during slower air velocity. The middle geothermal temperature of 66 C (150 F) produces two wide arcs with greatest power near the middle temperatures rather than the extremes. All three geothermal temperature configurations peak just above 18 MW but at a spread of three different temperatures, suggesting that used in tandem they could additively keep a steady base power between 25 MW to 40 MW and maximum power above 50 MW.

83. FIG. 27: Bundled Power from Three Low Mode Units at 10 C, and Two High Modes at 49 C, 66 C, at a Gradient of 30 C/kM All with Elevation Differences of 914 M and friction at 0.002 With Shock Loss Factored. This graph depicts using the each power variation to compliment the others by boosting power for one during low periods by the others. The combination delivers an average power of 46.2 MW with a maximum power of 84.9 MW at the coldest outside temperature descending to 51.1 MW at the highest ambient temperature, a 33.8 MW difference. Target depth is the depth needed to reach the targeted geothermal temperature. That depth is then doubled since the airway goes down then up again. The actual length of this passage will usually be greater than double its depth since it will descend and ascend at a slope. Within the geothermal gradient of 30 C/km a target depth of only 1630 M is needed to reach 49 C and 2187 M to 75 C.

84. FIG. 28: Bundled Power from Three Low Mode GWS and Four High Mode GWS from a Geothermal Gradient of 60 C/km. All Configurations at 914 M (3000 ft) Elevation Differences with friction=0.002 and Shock Loss Factored. As with the previous graph, three, Low Mode 10 C (50 F) near surface units are bundled with High Mode units to allow greater power during times of peak demand during hot temperatures.

85. FIG. 29: The Distances of Shafts, Tunnels and extra Depth to and from Geothermal Targets Shown for two Gradients each with vertical difference between portals of 305 M, 610 M, 914 M and 1219 M (1000 to 4000 feet) at Geothermal Temperatures of 49 C, 66 C, 93 C, and 149 C and at 10 C (with No Target Depth). Estimation of Construction Costs can be proportional to the excavation: the length multiplied by 113.01 square meter cross section for a 12 meters diameter passage, gives the volume in cubic meters. Here a comparison of total distance shows that the greatest distance is the tunnel down to the target geothermal gradient and back to the final chimney/shaft. Since the amount of excavation is great, much of the cut can be used to fill around a chimney addition to increase its elevation difference. Also shown is the difference in depths to target gradients for each geothermal temperature and the difference between a very high gradient of 70 C/km which is rare as compared to 30 C/km which is more widespread but requires more than twice the depth to reach 66 C.

86. FIG. 30: Watts per Cubic Meter of Total Excavation Including target depths for Gradients of 20 C/km to 60 C/km of Bundled Units and 10 C Low Mode Near surface both with Shaft Elevations of 305 M, 610 M & 914 M Compared to Single Units at 914 M only. All at f=0.002 & Shock Loss Factored. All Passage diameters are 12 Meters. This graph uses the total lengths of the tunnel & shafts from the previous FIG. 29 to calculate cubic meters of excavation for each and compare watts per cubic meter of excavation of each Average wattage calculated using increments from minus 10 F to plus 110 F (−29 C to 43 C) outside temperatures, although in this case most of the thermal conductivity takes place in the down draft passage to the geothermal target so that quantity is subtracted.

87. FIG. 31: Comparing MW/Cubic Meter of GWS Excavation to that of Coal: Sub-bituminous, Lignite & Sub-bituminous with Minimum Overburden (4.6 M~9.0 Tons/cubic meter) in Months of Power, Each at 914 M (3000 feet) Elevation Difference at 49 C, 66 C & 93 C (120 F, 150 F & 200 F) for Gradients of 20, 30, 40 & 60 C/km: Using calculations from FIG. 29 for watts per cubic meter of excavation from each model of GWS, figuring the megawatts per ton of coal and the cubic meters per ton, it is possible to compare the amount of time it would take to generate the same quantity of geothermal wind power. Research for power from sub-bituminous coal was obtained from the TVA yearly power generated by coal used from ten coal burning plants averaged to get 6567.33 MW/cubic meter varying by the efficiency of each plant. Estimates were calculated by coal burned per year and also by day. The higher quantity was used, which also agrees with the quantity for the lignite which is said to create about 0.7 as much power as sub-bituminous. Power per cubic meter for lignite was calculated at 4825.09 MW/cubic meter using data from the Coal Creek Station in North Dakota, the largest power plant in the state. These are processed quantities of coal, not reflecting the actual excavation. Minimum overburden is the amount needed to keep the coal from degrading by weather, which is considered 15 feet or 4.57 M. This quantity was added to a sub-bituminous coal seam of one meter thick. Although the overburden can be as much as 100 feet and coal can be thicker, 4.57 meters per meter of coal seemed a good compromise. By factoring in this overburden, the power per cubic meter drops to less than a fourth at 1178.42 MW/cubic meter. No overburden was considered for lignite. Lignite which has low overburdens, thick seams and lower density than sub-bituminous coal, produces less power. To simplify estimates, the density of lignite and sub-bituminous and the unknown rock excavated from each GWS is assumed to be the same, so for an equal pile of each type of coal and excavation spoils of airways, wind generating time could be compared to the power of the coal. This comparison demonstrates that although coal holds an enormous amount of power, over a reasonable amount of time, the GWS can pay back the initial investment in excavation.

88. Not surprisingly, the results reflect the quantities of FIG. 28. The configurations at 60 C/km have a much quicker time paying back the passage excavation of the represented units in power generation months compared to excavated coal than do the units at 20 C/km, but the middle configurations at 30 C/km and 40 C/km prove the more widespread and practical comparisons. At the 30 C/km gradient the payback compared to sub-bituminous with minimum overburden ranges from 18.3 months at 49 C to 35.6 months at 94 C and for Lignite, between 6.2 years and 12.3 years. For perspective, at 30 C/km a 49 C unit at 914 meters elevation difference and a total excavation of 485,295.31 cubic meters would produce the equivalent of the same volume of sub-bituminous coal (with minimum overburden) in 18.2 months producing a total power of 507,207,790 MW. Compared to the same coal but using the gradient of 40 C/km, the results are better with 13.6 months at both 49 C and 66 C and 14.5 months at 94 C. For Lignite compared to 40 C/km, all three units have payback times in less than five years. In all cases the 94 C sets were less efficient than lower geothermal temperatures, and as lower gradients led to greater excavation to target depths, the lowest temperature performed best.

89. FIG. 32: Comparing MW/Cubic Meter of Total Excavation to MW/Cubic Meter from Equal Quantities of Coal: Sub-bituminous, Lignite & Sub-bituminous with Minimum Overburden (4.6 M~9.0 Tons/Cubic Meter) Depicted in Months of Production for Each With Geothermal Gradient of Zero at 10 C in Low Mode Compared to Bundled Units of 49 C, 66 C and 2×10 C, at Four Gradients for Three Shaft Elevation Differences Each, All at f=0.002, factoring Shock Loss. In an attempt to compensate power drop off times based on outside temperatures, the concept of bundled arrays of single units with different geothermal temperatures on the same grid is explored. By using one unit at 49 C, another at 66 C and two units at 10 C power can be generated in a wide range of outside temperatures. FIG. 28 showed that these bundles do better than single units for the most part, and this finding is further proven in comparison to coal. These Bundles were varied by elevation difference between portals (610 M, 914 M and 1219 M) as well as geothermal gradients and all these results compared to those of 10 C with no target excavation at the same elevation differences. The 10 C configuration has a more efficient power production per cubic meter of excavation with the exception of those at the 60 C/km. At that gradient the temperatures are shallow enough to allow added power to make up for the target depth, but only at the highest elevation difference. The same result for that set applies to all three types of coal. Compared to Single units at the same elevation and gradient, the bundled always showed more power per excavation volume, except at 60 C/km at 914 M. Although only one month less for sub-bituminous coal and 4 months less than Lignite at 40 C/km, the bundled results for 30 C/km were 2.5 months less than sub bituminous, and 23 months less for lignite. At 20 C/km the bundled system depicted the production of power for an equivalent amount excavated sub-bituminous coal more than a year faster than the most efficient single unit at the same elevation difference and gradient. At 20 C/km compared to lignite, the bundled array shows production payback in 101 months while the most efficient single unit took 166 months.

90. In Mar. 3-7, 1999 Pruitt depicted use of a similar flywheel within U.S. Pat. No. 5,395,598, Convection Towers.

91. U.S. Pat. No. 6,278,197 by Appa discloses a design whereby two contra rotating turbines on concentric axles provide separate coil and magnets to allow the combined speed of counter rotation to generate more power.

92. Another patent using the turbine as the rotor of the generator is U.S. Pat. No. 7,825,532 B-1. Nov. 2, 2010, by Barber; Electrical Generator for Wind Turbine: A wind turbine uses a vertical wheel shape with blades in the position of spokes, and coils along the circumference as a rotor and a magnetic stator to generate electricity.

93. Calculations of power output were done for ambient temperatures at 10 degree increments Fahrenheit with a 50 F. degree (10 C) geothermal temperature in a 12 meter (39.36 ft) diameter system using a 6 meter venturi constriction and at elevations (differences between the upper and lower portals) of 1000 ft (305 M) increments from 1000 to 4000 ft. (305 to 1219 M) Sheet 12 shows a graph depicting these elevation differences for both f=0.0035 and f=0.002. Like all Low Mode Geothermal Wind Systems, when the outside temperature becomes the same as the inside, the wind stops. This diagram features eight hyperbolas, a white for f=0.002 and black for f=0.0035, each hyperbolas with two peaks of power at extreme temperatures. For the lower powered hyperbolas the white and black pairs are nearly congruent since friction is so low. Sheet 12 shows the above Low Mode set-up for various elevation differences and the average wattage generated. By those calculations at 1000 feet (305 M) the average power is nearly equal between the two Coefficients of friction: 1.3 MW and 1.4 MW reaching peaks at 2.9 and 3.0 MW and average Peak Demand at 2 MW each. At 4000 feet elevation difference (1219 M), the power tops out at 20.3 and 22.4 with an average of 9.6 MW and 10.4 MW. In all the above calculations the coefficient of friction at 0.0035 is associated with the lower power and f=0.002 with the higher power. Power from systems at 50 F (10 C) and f=0.0035, all of which having wind velocities less than 35 meters per second, average 85% to 93% as much as frictionless power and f=0.002 average 91% to 96% of frictionless power, both with higher elevation differences showing greater diminishment due to friction. The Low Mode GWS is particularly attractive since the high temperature peak matches peak demand and may be added to the grid for use when demand might exceed an otherwise overloaded capacity. (See Sheets 13, 18 and 19). Non-peak power will need to be stored.

94. The Geothermal Wind System can be operated at temperatures that are less than the temperature of steam, but power fluctuates with the outside temperatures and the higher the temperature difference between inside and outside, the more potential for power. The High Mode Geothermal Wind System is simpler than the Low Mode since it has a singular direction of airflow toward the portal at the highest elevation but is more difficult to achieve due to the large quantities of excavation needed to reach geothermal temperatures of 49 to 94 degrees centigrade (120-200 F) unless those temperatures are near the surface of the earth. Excluding extra excavation needed to reach the target gradient, the High Mode has the most cost effective excavation in watts per cubic meter, but when excavation to target depths is included, the higher geothermal temperatures begin to stall out since the distance to hotter rock is farther. With higher energy and swifter winds comes greater turbulence which limits power production particularly at higher elevation differences where greater length of airway means more friction.

95. If the target geothermal temperature is at a deeper elevation than the inlet Portal (Sheets 2, 3, 4, 8 & 9) the Heat Exchange Tunnel may have to be excavated down at an angle or series of steps until it reaches the target level, so the profile of the excavation with the stack completed may look something like a "J" as on Sheet 2. In calculating the wind speed, the shaft depth is only counted as the difference in elevation between the upper and lower portals, however the entire length should be used in calculating frictional head loss.

96. Sheet 14 compares three High Mode GWS calculations without extra target excavation at f=0.0035 showing the 300 F degree (149), 4000 foot (1219 M) system undergoing a lower trajectory of power production with a slight fall off during highest velocity (coldest outside) level. The 4000 foot Elevation of the 200 F (94 C) graph has slightly diminished power at the end. Zero friction graphs would show straight lines for all graphs.

97. When excavation is necessary to target geothermal temperatures the much greater surface of the airway can only be compensated for by smoother surfaces and aerodynamic enhancement such as riblets and nano polymer paint that fills microscopic pores or higher chimney/shafts. A coefficient of friction of 0.002 which is virtually unknown in modern mines may be obtainable, and allows reasonable efficiency in lower geothermal temperatures or very high gradients. Sheets 15, 16 and 17 illustrate this problem. Sheet 15 at a very high geothermal gradient still requires more than doubling the length and surface area of the lowest geothermal configuration at 49 C and more than triples the highest at 149 C. But by increasing elevation differences between high and low portals (chimney/shaft depths) the added friction is more than made up for by increased buoyancy from the chimney effect. In the following discussion of data, only the highest elevation difference (4000 ft=1219 M) is considered. The highest possible elevation difference should always be sought in construction of GWS even if it has to be built partly above ground. The 150 F (66 C) graph achieves the maximum power at more than 45 MW with average power at 28.3 but the 200 F (94 C) graph with lower maximum power shows greater average power at 33.3 MW, its trajectory deflected at the cold end. The 300 F (149 C) graph maintains a 21.6 MW average power, less than 2 tenths higher than the 120 F (49 C) configuration at the same elevation difference. The trajectory of power for 300 F (149 C) geothermal degrees is not only deflected drastically but bent in the opposite direction of the previous sheet and of all other geothermal configurations. The cold end yields the lowest power while the hotter ambient temperatures create the most power. The turn around is caused by the high turbulence created by the extreme gap between inside and outside temperatures. Lower geothermal temperatures by definition have smaller gaps between inside and outside temperatures.

98. Sheet 16 depicts a gradient so low and Target Excavations so deep the 300 F (149 C) can not operate. At 30 C/km, depths to the target temperatures more than triple those of the previous sheet. In this sheet the hottest geothermal temperature is 200 F (94 C), and the pattern of its graphs look a lot like the pattern of the 300 F (149 C) of Sheet 15. In this graph of power produced by the 200 F (94 C) at 4000 ft (1219 M), the point of lowest power is at the coldest temperature (6.3 MW). Rising as the temperature rises, maximum power of 17.8 MW occurs at about 80 F (27 C) degrees and then power drops in an inverted parabola to 15.9 MW at 110 F (43 C). The 66 C graph at 1219 M elevation difference describes half of an inverted parabola at low temperature end with temperatures between -10 F and +10 F (-23 to -12) hovering around 26 MW then falling steadily to 8 MW at 110 F (43 C) offering an average of about 12 MW during peak demand temperatures when temperatures rise above 80 F (27 C). The configuration for 200 F (94 C) produces an average power of 17.1 MW during peak demand, and the graph of 120 F (49 C) with maximum power of 32.1 MW at -10 F (-23 C) and average power of 17.8 indicating only 5.2 MW average during peak demand. Ideally a combination of several different geothermal temperature configurations linked on a grid might solve the problem of down time and power for peak demand.

99. Sheet 17 depicts power calculations for three geothermal temperatures (49 C=120 F, 66 C=150 F and 94 C=200 F) all at 4000 feet (1219 meters). They were made for two depths, 3500 meters (11480 feet) and 3000 Meters (9840 feet). These temperatures can all be found at 3500 meters or less all across all parts of the United States and near every major city. The same is true for the 3000 meter depth except 94 C is sometimes found a little deeper. The three trajectories for power from the 3000 meter depth all made partial inverted parabolas with maximum power around 18.5 MW, but each peaked at different outside temperatures, the 49 C around -18 C (zero F), the 66 C around zero C (32 F) and the 94 C at 21 C (70 F). Added together they would make a pretty good base source of about 43.6 average combined Megawatts. The graphs for depths at 3500 meters appear similar but with peaks that are lower by a few megawatts, the combined average totaling 33.8 MW. The problem is peak demand. The power falls by about 10 MW during high temperatures when more power is needed, but the solution is easy. The Low Mode at the same chimney/shaft elevation difference of 1219 M (4000 ft) with a geothermal temperature of 10 C delivers an average of more than 10 MW with an average of 15.2 MW during the highest four temperatures. It is also very compact having the total passage length and depth of 1564 M, almost one fifth of the total excavation of the other configurations. (See sheet 20). One drawback of the 4000 ft elevation depth, is finding geographical locations with suitable elevation differences, unless towers can be built. A number of tall chimneys in existence reach 300 meters, but that would still require another 3000 meters of depth. In the following graphs power from 914 meter elevation differences is explored using bundled power from several geothermal temperatures on the same grid.

100. Sheet 18 depicts bundled power at 914 Shaft Elevation difference from a 30 C/km gradient which favors the 49 C configuration with only 1630 M target depth and 66 C with 2187 M. These two alone would still generate low power during peak demand, but by adding three separate units of 10 C low mode, power during peak demand is boosted to an average of 41.8 MW. This combined shared grid would yield an average of 46.2 MW at an efficiency of 32 watts per cubic meter. Minimum power is shown at 27.3 MW with maximum at low temperatures at 84.9 MW.

101. While this gradient (30 C/km) is not as widely available as the previously mentioned depths between three point five and three kilometers, it can be found along the eastern seaboard from New Jersey South and south of Lake Ontario west of the Appalachians down the Ohio Valley, and likewise along the Mississippi Valley from Wisconsin (missing Michigan). All the Gulf States and those west of the Missouri River and Minnesota have large swaths bearing gradients of 30 C/km and greater. While not universally available 30 C/km is probably the most widespread gradient East of the Mississippi River that allows Target Depth shallow enough for competitive power production. Eleven of these bundled arrays could create a grid of 508 average Megawatts with a maximum power of more than 1300 MWe at minus 18 C (zero F).

102. Sheet 19 depicts an array of High Mode units at 914 meter elevation difference, but at the high geothermal gradient of 60 C/km, which allows for relatively shallow target depths. At 60 C/km 49 C (120 F) can be reached at 880 meters (2886 ft) and 149 C (300 F) at 2500 Meters (1.55 Miles). The High Modes at 49 C, 66 C, 93 C and 149 C fill in the base power and with the three Low Mode units greatly expand power during the cold temperatures. This Power can be stored, used in charging electric cars or in heating. With an average power of 86.55 MW and maximum of 134 MW for the lowest ambient temperature, the low power of is 81.6 MW reached at 43 C (110 F) outside temperature. Six of these arrays would create more than 500 MWe of power.

103. The extremely high gradient of 60/km is unknown east of the Mississippi but can be found in an 85 mile (137 km) stretch near the Missouri River in southern South Dakota. Larger areas found within a crescent basin from Yellowstone across most of Idaho, a number of dormant volcanic areas in Oregon, one 50 miles (80.5 km) in diameter another 90 miles long (145 km), some extending into Northern California and Nevada. Smaller hot spots are found in eastern Arizona and western New Mexico. One hot spot near San Diego, Calif. about 40 miles (64 km) in diameter reaches a gradient of 80 C/km for 250 C at 3000 meters. This graph shows the upper limits for most GWS power production.

104. Sheet Nine of the illustrations shows an embodiment having multiple drilled wells (11) rather than one large stack. One advantage of modern drilling telemetry provides for the guidance of drills along planned paths allowing the ability of the drill to turn and even travel upward. Remote sensors and signaling devices near the drill bit allow the path to be corrected, so it is not impossible for a number of wells to converge. In this embodiment a vertical shaft is the air intake with turbines (5) set on a vertical axis as on Sheet 6. Depending on the technology and geology, it may be cheaper and easier to drill multiple shafts that combine to create the same cross-sectional area as the tunnel. To drill enough three meter diameter wells to equal one 12 meter diameter shaft of 113.09 square meters, would require 16 wells, but the 16 wells would have a combined circumference of 150.78 meters as opposed to 37.7 meters for a 12 meter diameter shaft, increasing area for friction four times. These shafts or wells could also allow the exhaust to be vented in a more diffuse way, but their main benefit may be to reach geothermal temperatures too hot for human miners.

105. As noted above, Sheet 20 shows estimates of the lengths of twelve meter diameter tunnels necessary to heat the airflow at maximum calculated wind velocity for various geothermal temperatures. The longest Heat Exchange Tunnel required is for the 149 F (66 C), 4000 ft. (1220 M) shaft: 383.68 meters at the coefficient of friction of 0.002 but these heat exchange lengths only apply for near surface geothermal temperatures such as those from thermal springs. A target gradient of 30 C/km would allow a heat exchange of 3 degrees Centigrade per hundred meters, meaning most of the exchange would have taken place before arrival at the bottom. In the calculations using target depths, an extra length of 117 meters was added, which included 60 meters from the surface where the geothermal on average should begin. Sheet 20 does show the near surface heat exchange lengths above the doubled target depths to illustrate the relatively short lengths of the heat exchange which would more accurately account for turnaround length from the downward airway to the upward one.

106. Sheet 21 depicts Watts per average cubic meters of excavation at various geothermal temperatures in three comparisons. The first compares bundled power from an array including two 10 C units, one 49 C unit and one 66 C unit at three elevation differences, 610 meters, 914 meters and 1219 meters, all 12 meters of diameter, given at four geothermal gradients (20 C/km, 30 C/km, 40 C/km and 60 C/km) and these are compared to a 10 C single unit with no targeted gradient also at the same three heights, which is also compared to a series of single units at the same geothermal gradients as the bundled arrays but all at the same elevation difference of 914 meters with three different geothermal temperatures for each gradient. This graph can be used to estimate cost and compare multiple units of lower elevation with single units of higher elevation or higher geothermal gradient, and combinations of the two types depending on the geography. It also illustrates that the large difference overall lengths largely composed of target depth makes a tremendous difference in efficiency. The target depths represent the largest contribution to length and therefore the largest contribution to friction and turbulence, and since higher temperatures must be found at proportionately lower depths and must be doubled in most cases, the extra turbulence will at excessive depths overcome much of the heat gain. The graph specifically shows that even with the high gradient of 60 C/km, the 66 C geothermal temperature achieves the highest values at 51.2 watts per cubic meter for the 914 M Chimney Shaft Elevation, the only single configuration with greater efficiency than the 10 C configuration at the same elevation difference which has no extra depth to the geothermal gradient. The single 66 C unit at 60 C/km also has better efficiency than the bundled array (48.4 watts/cubic meters) at the same gradient and elevation difference. At 40 C/km with the same elevation, there is a leveling of efficiency between the three configurations, the 49 C unit providing 33.07 Watts per Cubic Meter compared to 33.06 for 66 C and 30.9 W/cubic meter for 94 C. At the lower Gradients of 20 and 30 C/km, the 49 C configuration having less distance to target gradient shows better efficiency despite less power than the 66 C configuration, while the 94 C configuration has the least power and least efficiency. The Bundled Arrays of high and Low Mode GWS at three shaft elevations show a progressive efficiency as the shaft elevations increase despite extra target depths, but only at 60 C/km and the highest elevation difference for chimney effect, does the efficiency become greater than the Low Mode 10 C at the same elevation difference but with no target depth. The Low Mode has a value of 49.9 watts per cubic meter compared to 51.2 w/cubic meter for the 60 C/km array.

107. Average ambient air temperatures and shallow depth geothermal temperatures usually fall between 50 F to 60 F in temperate regions but in sub-tropical climates may average 70 F, while in higher latitudes and altitudes the geothermal temperatures can approach 32 F. Deserts with high daily temperatures and low nightly temperatures may be well suitable for Low Mode GWS not only for the temperature differences but because water is not necessary. Tropical climates are less suited since the temperatures are higher and fluctuations from the average occur less often and to less extent than higher latitudes. Geothermal temperatures of more than 200 F would be suitable for tropical conditions with a favorable elevation gradient. High latitudes and altitudes are very conducive for High Mode GWS. Alaska with its geothermal potential, great elevation differentials and cool climate may find diverse uses for GWS, from providing power for military and mining outposts to creating light for the arctic winter and power for cities and villages. According to the 2003 geothermal Resource Maps of Western States by the Idaho National Engineering and Environmental Lab, The states west of Texas are peppered with geothermal springs and wells within vast swaths of land with known geothermal potential, meaning some areas moderately hot geothermal temperatures will be available at shallow depths. Alaska, Hawaii and the continental western states with their widespread hot geothermal fields and high altitudes may be bountiful places for High Mode GWS, particularly for military bases and other remote sites that need non-carbon generated electricity. Many third world countries with rugged geography or lack of rivers may be served by GWS. Low mode near surface units may be built with minimal technology.

108. In order to use the GWS to the utmost efficiency, because of the high wattage at low temperatures, a storage system should be incorporated, whether it is mechanical or chemical, it should be robust enough to store large quantities of potential energy for months at a time. The solution may be something simple such as pumping air into a large container or water into a high pool or generating hydrogen. It may be a matter of matching users such as factories to peak times and locations or electric cars to be charged with peak power or eventually heating with electricity. It is possible that by electrolysis of water, enough hydrogen and oxygen can be produced and used to boost internal heat during slack times when outside temperatures are near internal temperatures, thus continuing electrical generation.

109. The following comparison of GWS to other green energy is not for the purpose of competition, but to show feasibility of output compared to other methods. It is expected that in many places one kind of energy can compliment the other with boosts during down time, or in some places one will work well while others won't. The new Ivanpah thermal solar project is expected to create 392 MW in three phases using 3600 acres of desert and is expected to cost more than a billion dollars. Steamboat Hills Geothermal Plant in Nevada is preparing to supply 100 MW to Reno. Horse Hollow in Texas has an operational wind farm with a capacity of 735.5 MW using 291 GE 1.5 MW wind turbines and 130 Siemens 2.3 MW wind turbines on 47000 acres of land. Port Alma Wind Farm in Ontario just north of Lake Erie has a capacity of 101.2 MW using 44 turbines at 2.3 MW each.

110. An array of one 49 C (120 F) high mode GWS at 30 C/km bundled with two low mode 10 C (50 F) GWS all with elevation differences of 914 M all using 12 M (40 ft) diameter tunnels and shafts with 6 M (20 ft) diameter venturi) at f=0.002 could create an average 25.6 MW of clean power. Sixteen of these bundled arrays on a grid could produce an average of 409.6 MW in a grid, twenty could produce 512 MW and 40 could produce 1024 MW or 33.1 watts per cubic meter. These bundles could be produced in most states as long as there was 610 M (2000 feet) of relief and another 305 M (1000) ft of chimney could be placed on top. They could be done by present mining and construction engineering practices. Each bundled array would have a total of 6837 meters of passage (4.25 miles). Add another 305 M (1000 ft.) of relief for chimney effect and the power is increased from 25.6 MW to 36.5 MW with 7726 meters of passage (4.8 miles), so only 14 are needed to generate 512 MW (4.8 miles times 14=67 total miles) at 44.0 watts/cubic meter, whereas the lower shafts with 4.25 times 20 arrays=85 miles for the same power at 33.0 watts/cubic meter.

111. By placing the previous bundle (using 1219 M for the shaft effect distance) at a location with a gradient of 40 C/km, instead of 30 C/km, the target depth is shortened so excavation is less, and more power is generated. With average power of 40.1 MW and 6911 meters of passage (4.3 miles) the same 512 MW can be generated with 13 bundles totaling 54.8 miles of passage or 51.3 watts per cubic meter. This geothermal gradient is found in almost half of the United States and at least 24 major cities, limited only by the amount of topographic relief.

112. Comparing Lower Level GWS to recent Binary Geothermal Project, The 4.3 million dollar Beowawe, NY project using a 66 C to 149 C (150 F to 300 F) geothermal temperature is expected to produce 1.5 MW while a High Mode GWS at 3000 ft (elevation difference) with a 49 C (120 F) geothermal temperature in a 30 C/km gradient would produce an average power of 11.9 MW and a single low mode GWS with a 10 C (50 F) geothermal temperature and elevation difference of 914 M (3000 feet) would produce an average 6.84 MW, with a maximum power of 13.78 MW. All the above calculations were made using a 0.002 coefficient of friction. The above data can also be compared to other geothermal projects including Soultz in France producing 1.5 MW from a 3.6 km depth using an Organic Rankine Cycle plant. Landau in Germany is a binary EGS plant producing 3.0 MW from 160 C temperatures at 3.3 km depth. Other EGS sites are being developed including Paralana in Australia, now drilling a proposed 4.0 km well for a projected 7 to 30 MW plant, and Cooper Basin producing 1.0 MW but drilling a planned 4.3 km for a proposed increase to 110 MW. (Based on a 2008 Sandia Report on the DOE sponsored MIT investigation of EGS proposing to harvest 5 MW of electricity from 200 C at depths up to 6 KM (20,000 ft.) In addition Denmark has ongoing operations of geothermal heat pumps in Thisted that produce 7.0 MW of thermal energy from 44 C saline water at 1250 meters depth, 14.0 thermal MW from 73 C saline water 2.6 km deep in Copenhagen, and plans for extracting 68 C saline water at Sonderborg from depths of 2.1 km.

113. Sheet 18 depicts a Bundled array of Three low mode 10 C (50 F) GWS units with two high mode units one 49 C (120 F) and one 66 C (150 F) at 30 C/km, all five at 914 M (3000 ft) elevation differences (for chimney effect) produce an average of 46.2 MW with a Maximum power of 84.9 MW, and average peak demand at 41.8 MW. By using the second high mode unit of 49 C the minimum power is raised to 26.2 MW during an outside temperature of 16 C (70 F). Requiring a total of 13514.3 meters (8.4 miles) of passages at 12 meter diameter or 30.2 watts/cubic meters.

114. Dixie Valley, Nevada produces 60 MW, using gradients higher than 200 C/km at target depths of 3000 ft (914 M). To produce a similar amount of power, a bundle of one 49 C and one 66 C unit both at 40 C/km and both at 914 elevation differences between portals combined with three near surface 10 C low mode units could produce 60.2 MW of power average. Alternatively, the same bundle at 1219 M elevation difference but only two 10 C low mode units could produce 63.9 MW or this same array but at 60 C/km would produce 69.1 MW.

115. Energy companies describe the peak demand of power time as being almost opposite in summer from winter in temperate climates. In summer when days are longer and street lights are used less, a single peak occurs at the hottest part of the day when air conditioners kick on, probably the single most power consuming residential and commercial use. In the winter, there are usually two peaks, in the morning when people become active and before street lights go off (when days are shorter, and in the evening when commercial activity, street lighting and television usage surge, with a power dip when people working or sleeping. The low mode GWS is suitable to fit these needs supplementing existing power of various types or bundled with High Mode GWS. Since the near surface geothermal constant temperature is the mean average of all outside temperatures, the larger the separation between inside (geothermal) and outside (weather) temperatures, the greater the power produced.

116. Sheet 19 Depicts another Bundled array at the extreme geothermal gradient of 60 C/km. In this case, three low mode 10 C units are bundled with four different High Mode GWS, 49 C (120 F), 66 C (150 F), 93 C (200 F), and 149 C (300 F) all at 914 M elevation difference between higher and lower entrances. To get 149 C, a high gradient is necessary, and the target depth is still far down (2480 meters or 1.54 miles), but the excessive depth allows higher power when power from other units is diminished. The 149 C unit contributes an average 11.0 MW, the 93 C unit contributes 12.6 MW, 10.5 MW for the 66 C unit, and an average of 7.8 MW for the 49 C Unit. The three 10 C units contribute 6.8 MW each with a total of 86.55 MW for 20,007.3 meters (12.4 miles) or 38.25 watts per cubic meter.

117. If it were possible to add another thousand feet of vertical distance between the air entry portal and the exit portal to all the units in the previously bundled array, the total 21797.7 meters (13.5 miles) of passage would generate an average of 125.78 MW or 50.9 watts per cubic meters. There are some major challenges to building a bundle with this much power. Besides, finding a proper site, mining techniques have to be improved to tunnel through high temperature rock. The answer may be some sort of robotic machines controlled remotely or by miners in air conditioned suits, but until then, bundling more units and other kinds of power such as solar or outside wind could solve many problems.

118. Presently a major green energy project is underway in Ontario to divert a small portion of the Niagara River into a 14.4 meter diameter tunnel (finished diameter, 12.5). The world's largest boring machine will tunnel 10.4 kilometers through shale, limestone and dolomite, diving to 140 meters below the surface at a proposed cost of $640 million Canadian dollars. The tunnel will allow water traveling 500 cubic meters per second to generate 150 MW or 1600 giga-watt hours per year. The previous mega bundle GWS could produce only 125.8 MW in using almost 21.8 kilometers, more than twice the length of the Niagara tunnels. Fifteen low mode near surface units at 1219 elevation difference could generate an average of 155.4 MW but would require 23471.7 meters of passage and the power would diminish to zero as the outside temperature approached equality to the geothermal constant, in this case 10 C or 50 F.

119. By combining three High Mode 94 C Units at 1219 meters of vertical difference using near surface geothermal springs at 94 C (200 F) and adding three near surface 10 C also of 1219 meters of vertical distance and one 10 C low mode unit at only 610 meters of chimney effect elevation difference (producing only 3.78 MW), these three high mode units and four low mode units could produce a maximum power of 300.1 MW at the outside temperature of −23 C (−10 F) and a minimum power of 145.2 MW at 21 C (70 F) outside temperature. An average of 188.39 MW would be generated from 10.56 kilometers of total tunnels and shafts. This near surface bundle turned out a little longer than the Niagara River Hydro Tunnel, but at 14.4 meter diameter, Niagara would require 1,693,426.1 cubic meters of excavation to produce 8.8 watts per cubic meter, but the near surface 12 M diameter GWS at 10.56 kilometers long would equal only 1,194,082.5 cubic meters generating 15.77 watts/cubic meter of average power or at minimum power of 145.2 MW, producing 12.16 watts per cubic meter excavated. The interesting point of this exercise is that none of these results are very impressive for the watts per cubic meter, but like the GWS water power is cheap after the set up costs. Like GWS it is also clean and sustainable.

120. The Distances for the near surface bundle were calculated by adding the elevation difference between entrances for each plus 60 meters to the static temperature zone for each and the optimal heat exchange lengths as discussed in paragraph 69 using the Taylor-Prandtl formula and Fourier's Law. The drawing on Sheet 3 shows how the spring fed GWS would work. An enlarged tunnel would allow round stones to be placed between the metal lining and rock face, facilitating flow of hot water.

121. Coal produces enormous quantities at great expense. It would seem to dwarf the power output of GWS until the excavation is compared. By comparing energy per cubic meter of coal to the time in production for a GWS to equal the amount of cubic meters excavated, the time to produce that much energy can be considered payoff, after which the GWS can be considered to run with minimal cost although coal has to be continuously excavated. Terms are somewhat arbitrary since high geothermal temperatures are usually found in harder rock than coal which is mined differently, and the actual overburden per ton of coal may vary greatly. On the other hand, the grinding and cleaning of coal and other processing for the boiler that produces steam are not included in estimates. The limestone quarried for the emissions scrubbing process is also not included. A very complicated plant has to be built, and fuel has to be used getting the coal to the plant, and large quantities of water have to be used. These calculations are meant to be an illustration of the feasibility of the GWS and a perspective of the workability of the design.

122. GWS was first compared to sub-bituminous coal with no overburden, already cleaned and separated. That may make up for the hardness of geothermal rock and the complications of a vertical shaft. The comparisons were made with published records from the TVA averaging daily coal and power output from ten plants. Lignite was also factored since it is abundant and easily extracted west of the Mississippi and gulf coast states. Lignite data was taken from one plant, Coal Creek Station in North Dakota, the largest power plant in the state, which was built adjacent to the coal fields. The deeper the coal the more compressed it is and the harder it is and hotter it burns, so since Lignite is low-grade, less carbon, near surface and less dense it contains less potential megawatts of electricity than sub-bituminous. The data from Coal Creek Station suggests 4825.09 watts per cubic meter for lignite compared to 6567.33 watts per cubic meter for sub-bituminous with no overburden, which indicates almost a third more the potential power for sub-bituminous, but that amount discounts overburden. Sub-bituminous is said to require at least 15 feet of overburden otherwise water filtration may degrade it to something less burnable. This distance of fifteen feet (4.573 M) is called the minimum overburden. So for every cubic meter of sub-bituminous coal, 4.573 cubic meters of overburden has to be added to the excavation and the watts/cubic meter for the minimum overburden becomes 1178.42 watts/cubic meter, considerably less than lignite. GWS is very competitive with coal if overburden is included.

123. As Shown in Sheet 22, a single Elevation Difference of 914 M is used for geothermal temperatures of 120 F (49 C), 150 F (66 C), and 200 F (94 C), each for geothermal gradients of 20 C/km, 30 C/km, 40 C/km and 60 C/km. Quantities are estimated for a coefficient of friction at 0.002. Shock Loss (as above) was also factored. The configurations at 60 C/km have a much quicker time paying back the passage excavation of the represented units in power generation months compared to excavated coal than do the units at 20 C/km, but the middle configurations at 30 C/km and 40 C/km are the more widespread and practical comparisons. At the 30 C/km gradient the payback compared to sub-bituminous with minimum overburden (henceforth to be called SBMO) ranges from 18.3 months at 49 C to 35.6 months at 94 C and for Lignite, between 6.2 years and 12.3 years. For perspective, at 30 C/km a 49 C unit at 914 meters elevation difference and a total excavation of 485,295.31 cubic meters would produce the equivalent of the same volume of SBMO in 18.2 months producing a total power of 507,207,790 MW. Compared to SBMO the gradient of 40 C/km the results are better with 13.6 months at both 49 C and 66 C and 14.5 months at 94 C. For Lignite compared to 40 C/km, all three units have payback times in less than five years. In all cases the 94 C sets were less efficient than lower geothermal temperatures, and as lower gradients led to greater excavation to target depths, the lowest temperature performed best.

124. Having compared coal with single units of GWS, bundled arrays were compared on Sheet 23 each bundle featuring units of 49 C, 66 C and 2×10 C, three shaft elevation differences (610 M, 914 and 1219 M) each, All at f=0.002, factoring shock loss. Watts per cubic meter was compared for each bundle in sets of three elevation differences at four geothermal gradients of 20, 30, 40 and 60 C/km. All these results were compared to those of a single unit low mode 10 C with no target excavation at the same three elevation differences. Compared to Single units at the same elevation and gradient, the bundled arrays showed more power per excavation volume, except at 60 C/km at 914 M. Considering only the 914 elevation difference, the statistics show even at the 20 C/km gradient, the payoff compared to SBMO is slightly more than two years, and compared to lignite less than ten. At a 30 C/km gradient compared to SBMO, 15.8 months payback, and 64.7 months for lignite. At 40 C/km payback is a year and a half for SBMO and 52 months for lignite. For 60 C/km the pay off in SBMO was 9.3 months and 38 months compared to lignite. At the same elevation, the single unit low mode 10 C configuration with no target depth has the least payback at 7.7 months for SBMO and 36.9 months for lignite. The above statistics suggest that the 30 C/km and 40 C/kM gradients are viable for GWS power, although higher albeit rarer gradients can be more productive, and that bundled arrays of GWS units from varying depths can be efficient in customizing power to a wide spectrum of outside temperatures.

125. In 2003, 1071.8 million short tons (2000 lbs/ton) were mined in the USA. Of that, 352 million short tons were mined underground. If one short ton is roughly equal to 1.45 cubic meters, then in one year 522,144,000 cubic meters were mined underground. If that same underground mining effort were to be used to construct low mode GWS units (10 C at 914 meters elevation difference between portals), 3,626 units in groups of 73 could be added to 49 cities to generate an average 506 megawatts to supplement peak demand or charge electric cars. Or 245 cities could add 101 MW of electricity or a total of 24,806 MW.

126. Using the same effort the second year with the same volume of mining, groups of two low mode, 10 C units and one high mode 49 C unit at a gradient 30 C/km could be bundled into 34 grids of 19 units to produce an average of 508 MW each to compliment power in 34 eastern cities with total power for all at 17289.95 MW.

127. The following year, with the same effort, the same triple unit bundle could be constructed in gradients of 40 C/km and 766 of these bundles could be distributed in groups of 19 to generate an average of 500 MW for forty cities in the gulf states of Mississippi, Louisiana, Arkansas, Alabama and Oklahoma and east Texas, a total power of 20453.6 MW.

128. The forth year, using the same amount of excavation, the same triple unit bundle with 914 meter elevation difference could be constructed in the western states at a 60 C/km gradient and 740 bundles could be distributed in groups of 12 to 61 cities for an average of 500 MW for each city for a total power of 30735.5 MW 129. On the fifth year, retuning east to the Appalachians the same bundle of three could be built at 30 C/km but an additional 1000 feet (305 M) could be added to the elevation difference, creating 597 bundles to be distributed in groups of thirteen which could generate an average of 500 MW at each of 46 locations to replace the aging coal fired plants of the TVA with a total of 22984.0 MW.

130. By the sixth year, mining technology may have improved enough to bore down into geothermal temperatures greater than 49 C. Again, using the same material removal as was used excavating underground coal in 2003, a total of 387 arrays consisting of three low mode 10 C configurations bundled with one 49 C and one 66 C high mode configuration, both at 40 C/km, all shafts at 914 M between entry and exit portals, each array producing an average of 60 MW, could be constructed in groups of nine to bring 540 MW to 43 cities in the western states creating a total of 23,335.6 MW.

131. By the seventh year, imagine what could be accomplished if all the excavation done for coal, both surface and underground, in one year was devoted to GWS. In 2003, the total tonnage of coal mined in the USA was 1,071,900,000 short tons, times 1.45 equals 1,554,255,000 or more than one and a half billion cubic meters not including overburden. With that amount of excavation, 1016 arrays of three low mode, 10 C configurations and two high mode units of 49 C and 66 C both at 30 C/km all at 914 M (shown as a graph on sheet 18). These 1016 arrays could be built in grids of 11, each generating 511 MW at 92 locations in the east and Midwest, generating a total of 47,012 MW.

132. In the eighth year, the previous 1,554,255,000 cubic meters of excavation could be reproduced to build 983 arrays of bundled units consisting of three low mode 10 C units and three high mode units of 49 C, 66 C, 93 C at a gradient of 60 C/km, all units at 914 M. These arrays could be arranged in grids of seven each creating a 530 MW for 140 western locations where 60 C/km is available. The total new power created that year would be 74,286.5 MW 133. In the ninth year, using the same quantities of excavation, the same arrays from the previous year with three high and three low mode units at 60 C/km but this time adding 305 M (1000 ft) to the elevation difference, each array generating 111.0 MW of power. A total of 871 arrays, in grids of five generating 555.0 MW could be constructed in 174 locations in mountainous states having high elevation relief and high geothermal relief such as Colorado, Hawaii, Idaho, California, Arizona, Alaska, Utah and New Mexico for cities, technical centers and military bases for a total of 96752.17 MW.

134. In the tenth year using the same quantities of more than a billion and a half cubic meters, a lower gradient of 20 C/km could be used to bring power to the upper Midwest and Eastern States. Using three Low Mode 10 C units bundled with a 49 C and 66 C units at 20 C/km all at 914 M to generate 39.9 MW each. Because of the low gradient and deeper excavations to the target temperatures, lower power is generated and more arrays are needed to create maximum power. In this case, 793 arrays could be built in grids of 13 generating 519 MW for 61 cities for a total of 31661.9 MW. By the end of the tenth year, 389,310.9 MW of clean energy would be empowered or 12,243,671,000,000 megawatt hours per year.

135. Instead of becoming more dependent on centrally located, high mega-watt stations for energy, the use of widespread lower-wattage facilities comprised of various green energy strategies will allow the power to become more reliable, less polluting and in the long run cheaper. Besides the pollution and carbon drawbacks of coal fired plants and the possible hazards of nuclear, they both take large quantities of water, as does fracturing of shale gas.

136. While each clean energy mode has a drawback or down time, together they can compensate for one another, and as they become more widespread and efficient, eventually replace all carbon dependent plants. If electric cars are to be successful, energy stations will need to be built. It seems likely that the first arrays of the new energy grid will follow the expressways. The low mode GWS along with solar and traditional wind are conceivably a good fit to power our highways and electric rails. In low elevations, a 500 foot tower above a five hundred foot shaft Low Mode GWS could provide an elevation difference that could generate more than a megawatt average with peaks of more than two megawatts when the outside temperature drops to zero F or rises to 100 F. Other higher elevations would increase the yield. Down time during middle temperatures would be mitigated by storage facilities and by solar and traditional ambient wind.

137. Small scale, Low Mode Geothermal Wind Systems could be put in place at first as standby stations to protect the grid when large plants go down due to a natural disaster or computer glitch or when peak demand threatens to overpower traditional plants. As demand grows over time, additional systems could be added to the grids until they replace the old plants entirely as they become obsolete. They may also be used effectively in remote scientific or military posts, in mining and industrial complexes or web servers. They could become significantly useful in third world countries that have scarce water or are beginning new power systems. These are possibilities that could be implemented in the reasonably near future using technology already developed in mining and aerodynamics.

The invention claimed is:

1. A geothermal wind system comprising:
a) underground passages with rock being directly heated by geothermal temperatures of the surrounding surface;
b) one or more portals for conducting air into said passage;
c) wind turbines each having an adjustable radial venturi valve mounted inside said passages;
d) a corrugated conduction enhancer having riblets mounted to the passage surface in the heat exchange tunnel;
e) wherein when the geothermal temperature is colder than the outside temperature, the cool air in the stack will fall downward pulling warm air in through an upper portal to drive the wind turbines;
f) wherein when the geothermal temperature is hotter than the outside temperature, the air inside will rise through the stack pulling cool air in from the lower portal, the wind created driving one or more wind turbines.

* * * * *